March 11, 1930.　　　W. E. SYKES　　　1,750,030
MACHINE FOR CUTTING GEAR TEETH
Filed May 24, 1923　　　9 Sheets-Sheet 1

March 11, 1930.  W. E. SYKES  1,750,030
MACHINE FOR CUTTING GEAR TEETH
Filed May 24, 1923  9 Sheets-Sheet 2

Inventor
William E. Sykes
By Henry E. Rockwell
Attorney

March 11, 1930.                W. E. SYKES                 1,750,030
                     MACHINE FOR CUTTING GEAR TEETH
                        Filed May 24, 1923      9 Sheets-Sheet 4
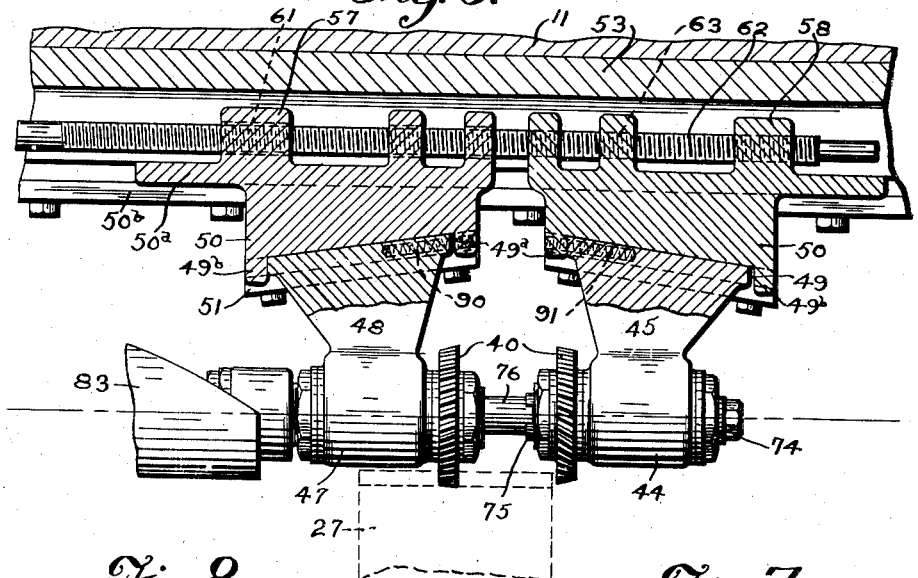
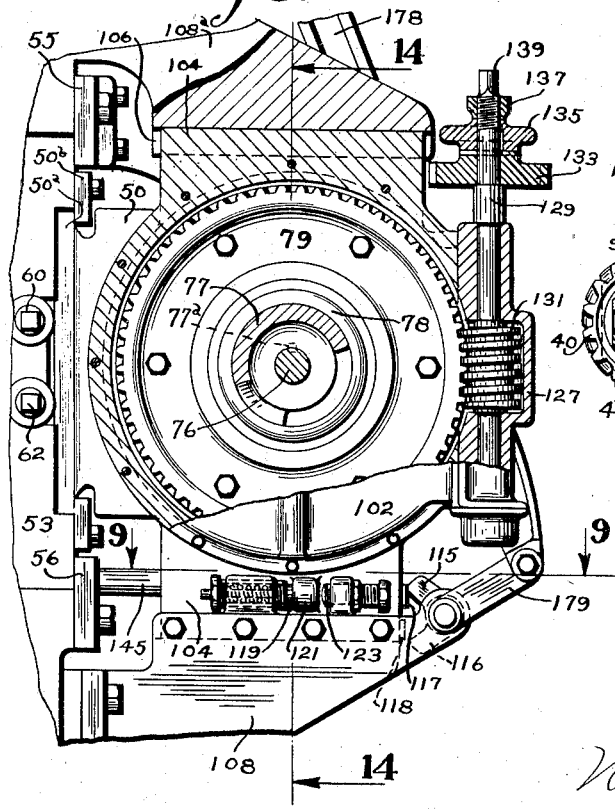
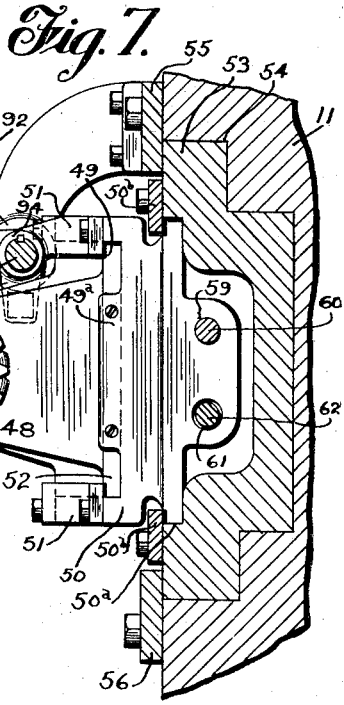

March 11, 1930. W. E. SYKES 1,750,030
MACHINE FOR CUTTING GEAR TEETH
Filed May 24, 1923 9 Sheets-Sheet 6
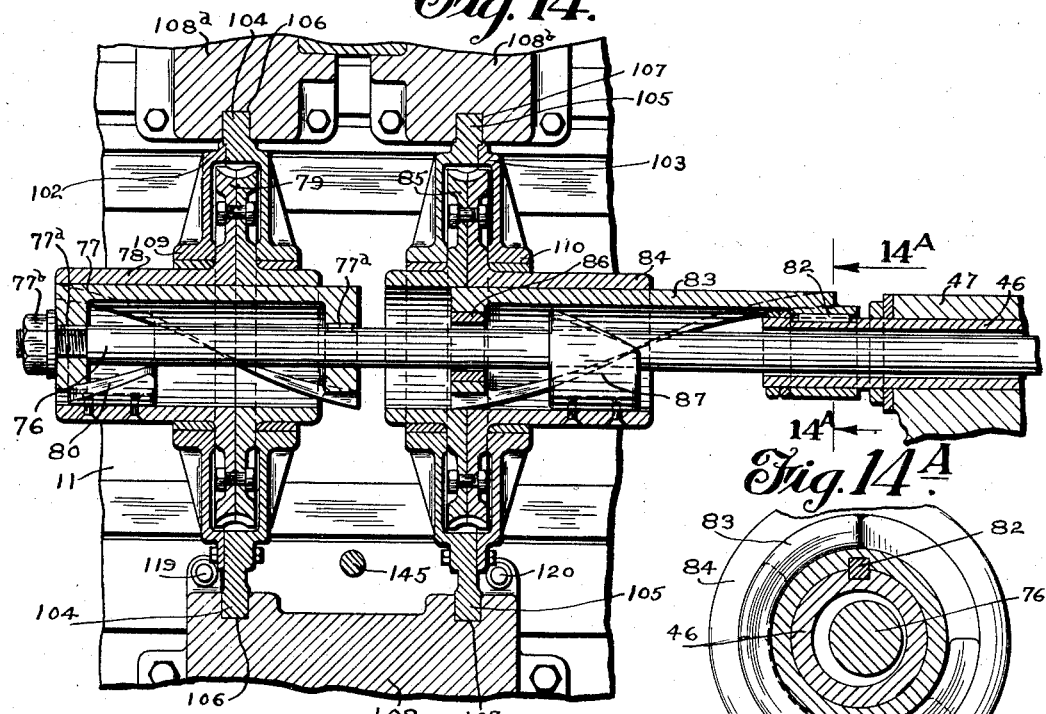
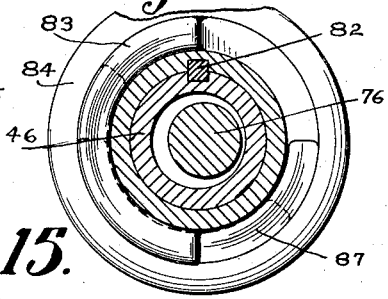
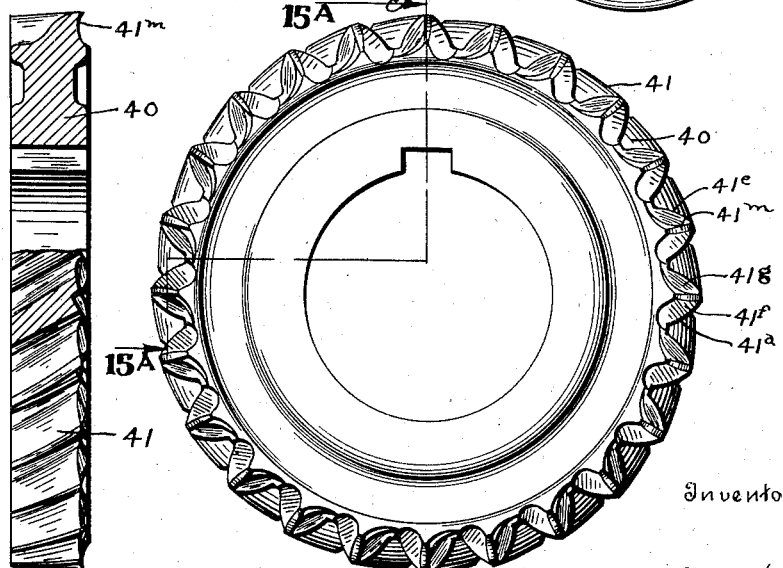
Inventor
William E Sykes
By Henry E Rockwell
Attorney

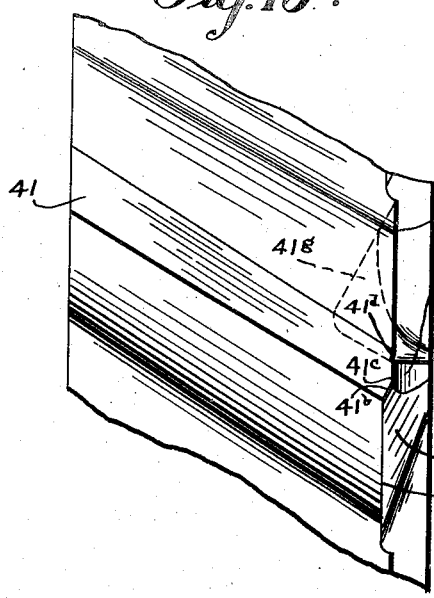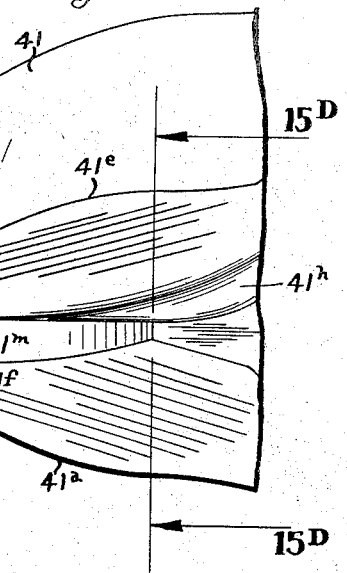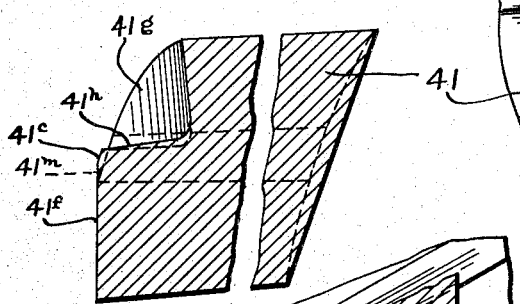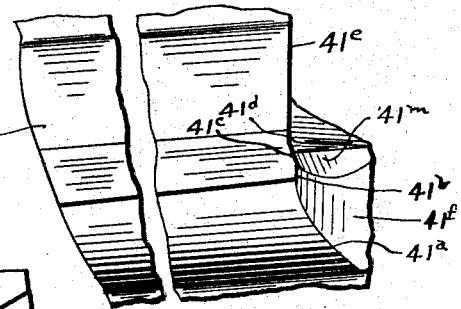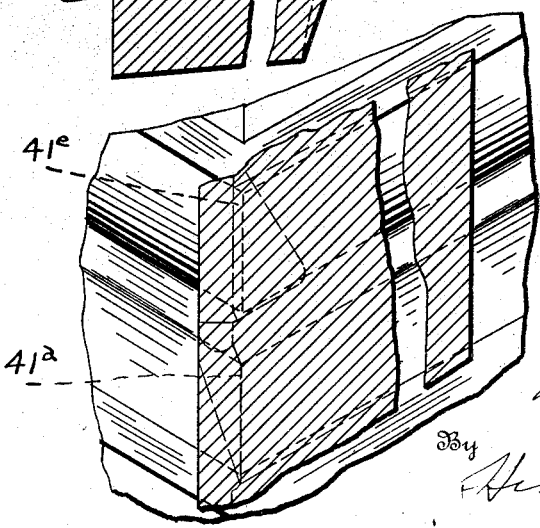

March 11, 1930. W. E. SYKES 1,750,030
MACHINE FOR CUTTING GEAR TEETH
Filed May 24, 1923 9 Sheets-Sheet 8
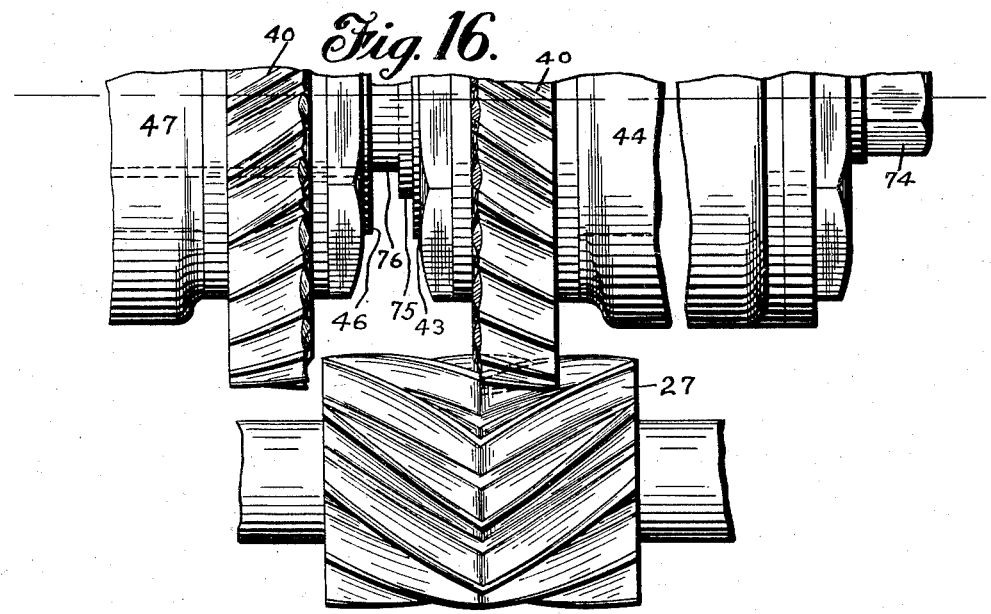
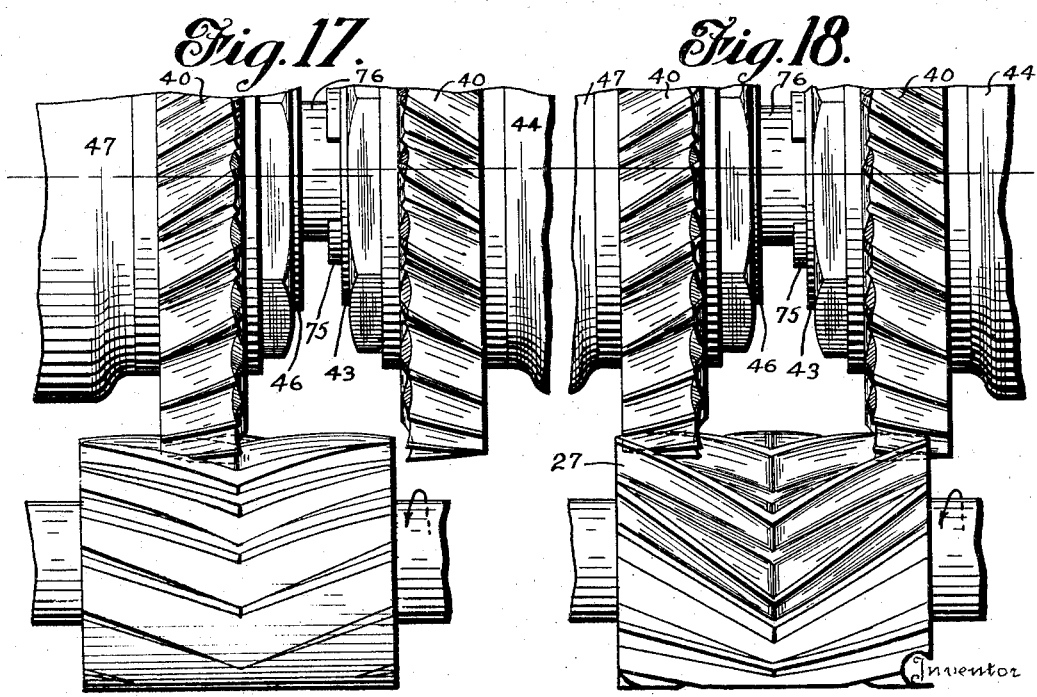
William E. Sykes
By Henry E. Rockwell
Attorney Fig.19.    Fig.20.    Fig.21.
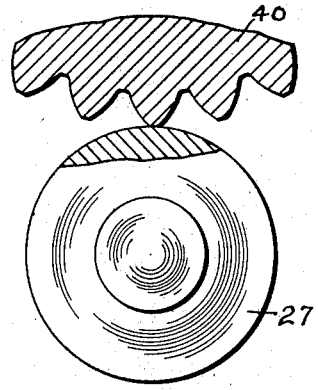 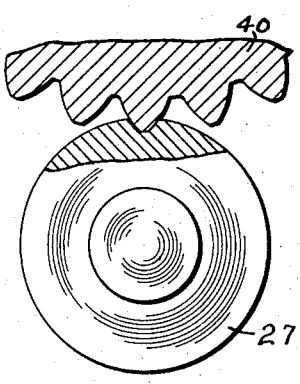 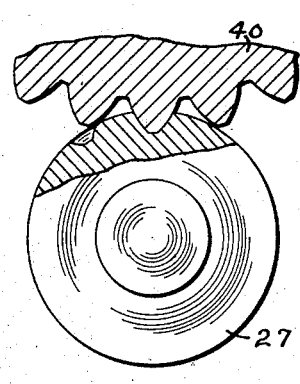
Fig.22.    Fig.23.    Fig.24.
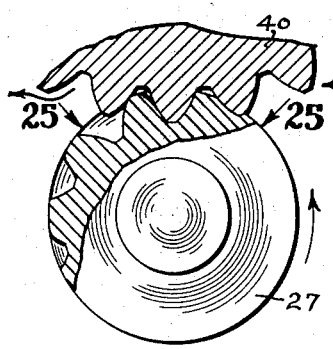 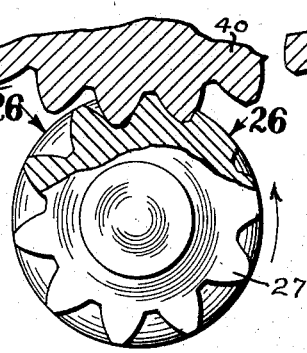 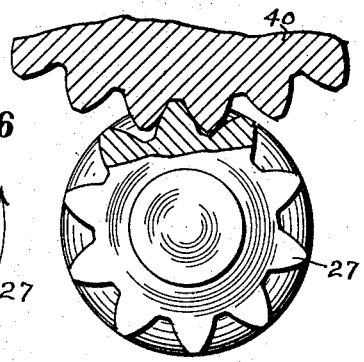
Fig.25.    Fig.26.
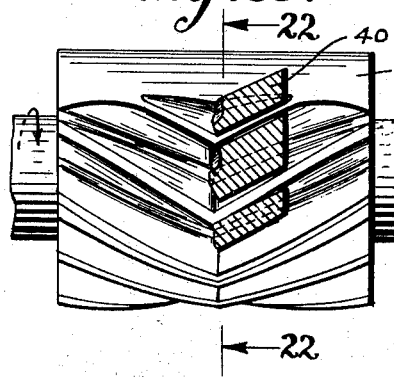 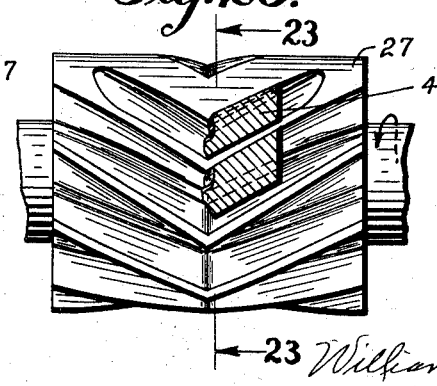

Patented Mar. 11, 1930

1,750,030

UNITED STATES PATENT OFFICE

WILLIAM EDWIN SYKES, OF SLOUGH, ENGLAND

MACHINE FOR CUTTING GEAR TEETH

Application filed May 24, 1923, Serial No. 641,126, and in Great Britain August 30, 1920.

This invention relates to improvements in machines for forming the teeth of gears, and while the invention comprises certain features which will be found advantageous in cutting straight tooth gears, such as spur wheels and pinions, for example, it is more particularly concerned with the cutting of helical gear teeth and is readily applicable to the cutting of either single or double helical teeth in the periphery of a gear blank.

One object of my invention is the provision of a machine whereby double helical or herringbone teeth, running continuously across the gear face, can be cut in the blank in a commercially practical and satisfactory manner.

Another object of my invention is to provide a machine by which double helical or herringbone gears with continuous teeth, may be cut by the use of a pair of cutters advancing toward the center of the blank face from opposite sides thereof, respectively, and so arranged that each cutter will advance substantially to a median line upon the face of the blank or to the apex of each tooth, and then be returned to its original position, in order that the teeth may be continuously formed across the face of the gear.

It is also proposed to provide a machine whereby the apices or angles of continuous herringbone teeth can be cut in a clean and accurate fashion.

Another object of my invention is the provision of a machine of the character described, which permits of great accuracy in the formation of gear teeth, while requiring a minimum amount of attention on the part of the operator.

Other objects are to provide for a proper relief of the cutter at the end of the cutting strokes; to evolve a device for cutting gear teeth in which a cutter of gear wheel or pinion formation and the blank to be operated upon are given continuous rotary, generating movements of substantially equal peripheral velocities; and to improve generally and in detail gear cutting machines in use prior to this time.

Generally speaking, my improved machine, as applied to the production of double helical or herringbone gears, contemplates, preferably, the use of a pair of alternately acting cutters of pinion formation, which are so controlled that each has imparted to it a reciprocatory, twisting movement during the cutting stroke, after which it is given a bodily or translatory movement by which the cutter is released from the work on the return stroke; and, at the same time that each cutter is given this reciprocatory twisting movement for cutting a tooth of the desired angle or obliquity, both the cutter and work are given a relatively slow continuous rotating movement, so that a continuous cutting or generating operation is effected. Other features, however, hereinafter explained, are of importance in cutting gears of various types and dimensions.

To these and other ends, the invention consists in the novel features and combinations of parts to be hereinafter described and claimed.

In the accompanying drawings:

Fig. 3 is a side elevation of the machine;

Fig. 6 is a sectional view through the cutter carriage and carriage slide, on line 6—6 of Fig. 1;

Fig. 7 is a sectional view on line 7—7 of Fig. 1;

Fig. 8 is a sectional view on line 8—8 of Fig. 1;

Fig. 14 is a sectional view through the cutter spindles on line 14—14 of Fig. 8;

Figure 1:
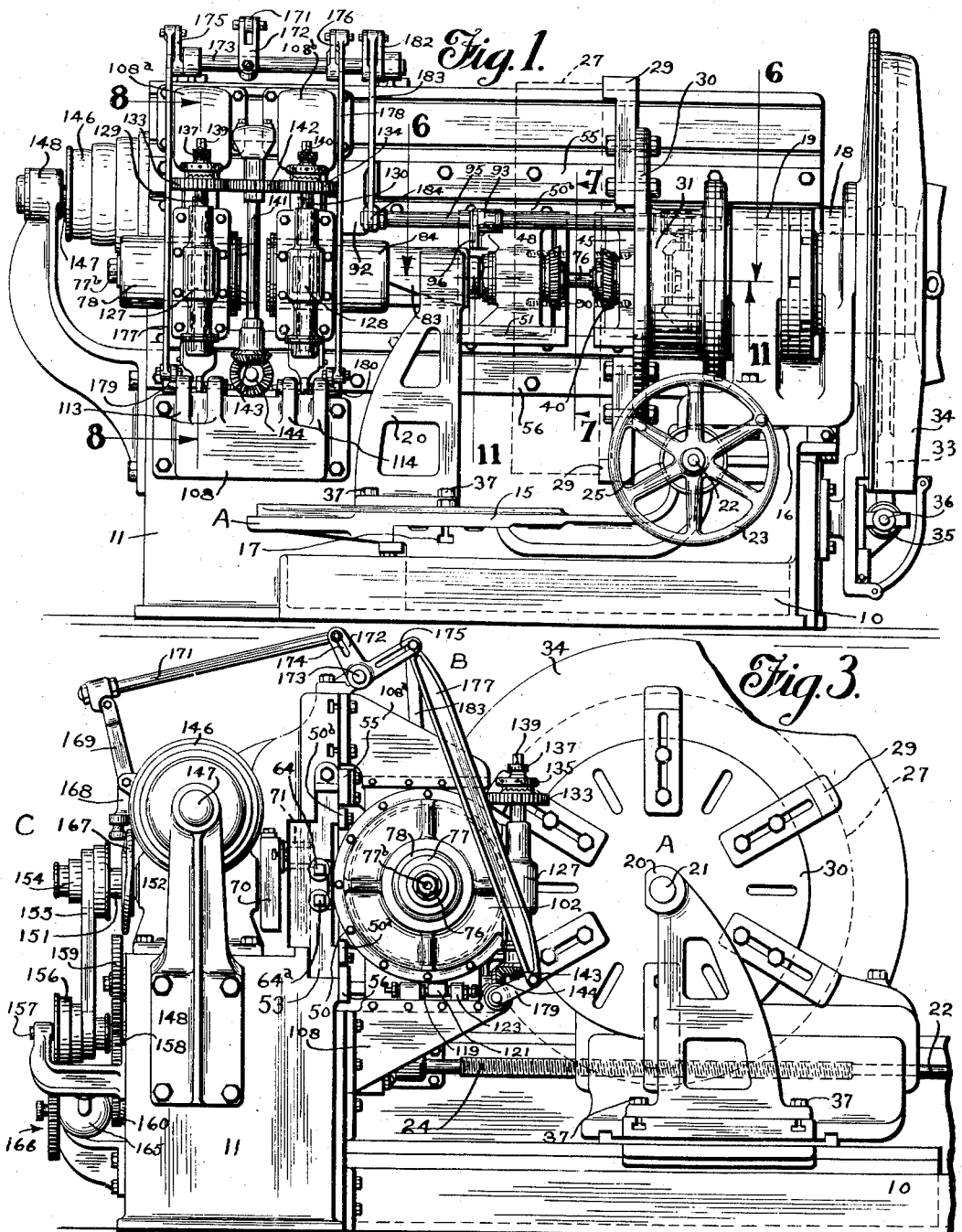
Fig. 1 is a front elevational view of a gear cutting machine embodying my improvements.

Fig. 14ᵃ is an enlarged transverse sectional view through the cutter spindles on line 14ᵃ—14ᵃ of Fig. 14;

Fig. 15 is a side view of one of the cutters, the view showing the cutting edges of the teeth;

Fig. 15ᵃ is a face view of the cutter, partly in section, on line 15ᵃ—15ᵃ of Fig. 15;

Fig. 15ᵇ is an enlarged face view of a portion of the cutter pinion sufficient to show one of the cutting teeth;

Fig. 15ᶜ is an end view of one of the teeth of the cutter;

Fig. 15ᵈ is a sectional view on line 15ᵈ—15ᵈ of Fig. 15ᶜ;

Fig. 15ᵉ is a view of one of the cutter teeth looking along the plane designated by the reference character 41ᵍ on Fig. 15ᶜ;

Fig. 15ᶠ is a view of a portion of the gear blank being operated upon by one of the cutter teeth, the latter being shown in section;

Figs. 16, 17 and 18 are plan views of the cutters in three different positions, and a pinion in different stages of production;

Fig. 19 is a diagrammatic view, showing the operation of cutting the teeth in a pinion blank of small diameter, the view showing the blank being fed against the teeth of the cutter;

Figs. 20 and 21 are views similar to Fig. 19, showing successive stages in the progress of the work;

Figs. 22 and 23 are sectional views on lines 22 and 23 of Figs. 25 and 26, respectively, showing different stages in the cutting operation;

Fig. 24 shows the completion of the work;

Fig. 25 is a sectional view about the periphery of the blank on line 25—25 of Fig. 22; and Fig. 26 is a sectional view about the periphery of the blank on line 26—26 of Fig. 23.

I have illustrated in the accompanying drawings, the preferred embodiment of my invention, but it will be understood that various changes in details may be made in parts of the device without departing from the invention, although the particular mechanism shown is preferred for performing certain classes of work.

Figure 2:
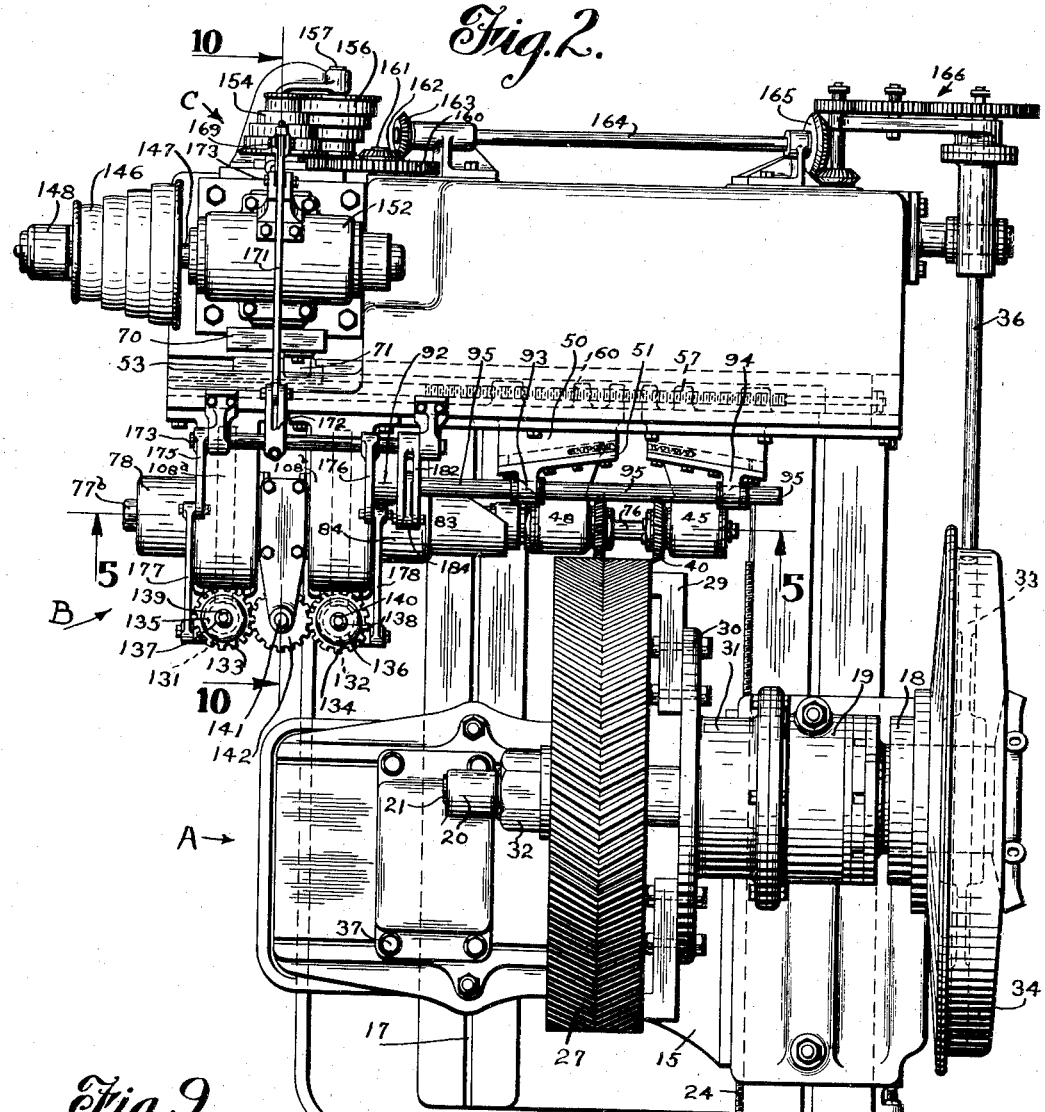
Fig. 2 is a plan view of the same with a large blank mounted therein.
Figure 9:
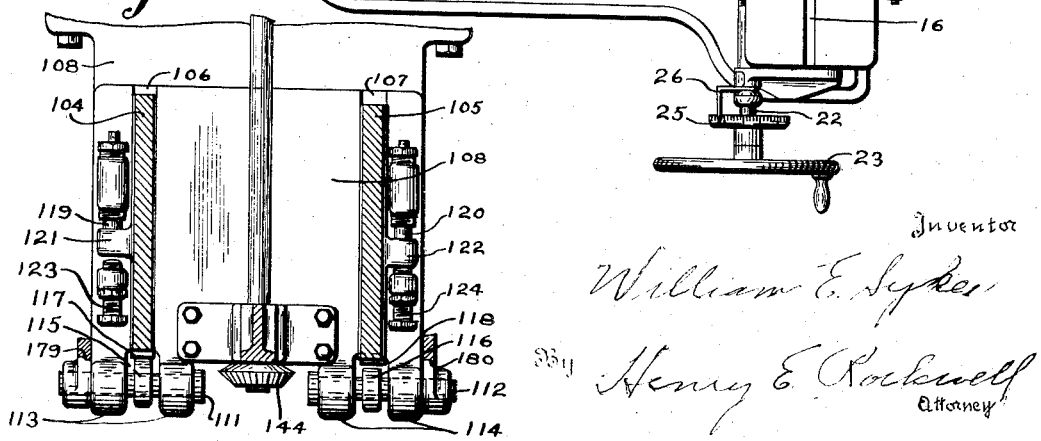
Fig. 9 is a sectional view on line 9—9 of Fig. 8 showing the worm wheel casing support.

Referring more particularly to Figs. 1 to 3, the device consists of a main supporting frame, having a forwardly extending bed plate 10, and a vertically disposed rear standard 11. Upon the bed plate 10 is reciprocably supported a work carriage designated as a whole by the letter "A", while upon the standard 11, are mounted the cutters and their operating mechanism designated by the character "B", and the power transmitting mechanism "C".

The carriage "A" consists of a supporting frame 15, reciprocably mounted on guideways 16 and 17, on the bed plate 10, the guideway 17 being positioned close to the bed plate to admit of the use of a blank of large diameter. Upon the frame 15 are bearings 18, 19 and 20, in which is rotatably mounted the work or blank carrying shaft 21. A shaft 22 is rotatably mounted in bearings in the bed plate 10, for rotation by means of a crank wheel or the like 23. The shaft is threaded substantially throughout its length, as shown at 24, and has a threaded connection with the supporting standard 15, so that upon rotation of the shaft the entire carriage "A" is moved longitudinally of the bed plate, in order to present the work to the cutters. An index wheel 25, may be provided upon the shaft 22, with which a pointer 26 upon the frame may cooperate in order to properly gauge the extent to which the work is moved toward the cutters, so as to properly regulate the depth of the cut made in the peripheral face of the blank.

A blank is shown at 27, mounted rigidly upon the shaft 21, the right hand face of the blank being lodged against the edges of L-shaped arms 29, radially adjustable upon a plate 30, having an integral hub 31 rigidly mounted upon the shaft 21. A nut 32 threaded upon the shaft 21, upon the side of the blank, opposite the L shaped arms 29, forces the blank against these arms and holds it rigidly in position. Upon the right hand end of the shaft 21 is secured a worm wheel 33, shown in dotted lines within a guard or casing 34, the teeth of the worm wheel being engaged by a worm 35, upon a shaft 36.

It will be noted that the journal standard 20 is removably mounted by means of bolts or the like 37, upon the carriage standard 15, so that the blank 27 may be placed upon and removed from the shaft 21.

Figure 5:
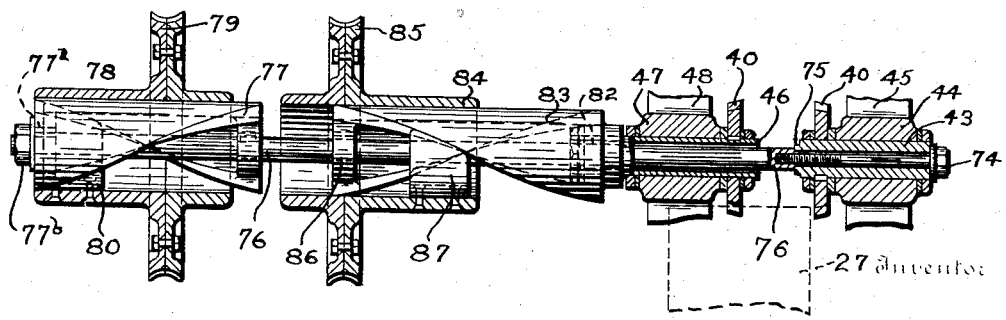
Fig. 5 is a sectional view through the cutter spindle, on line 5—5 of Fig. 2.

In the preferred mechanism shown in the drawings, I employ cutters in the form of pinions or gears, as shown at 40 in Fig. 15. It will be noted that the teeth 41 upon the periphery of the cutters, are of helical form and will be of substantially the same shape in cross section as the furrows to be cut in the blank. In cutting double helical gears, I prefer to use two of these cutters, as shown for instance, in Figs. 2 and 5, the cutters being similar in shape but positioned opposite each other so that their cutting edges lie in opposed relation.

In cutting continuous herringbone teeth, the cutters should finish their respective strokes substantially on the same line which should preferably be substantially in a plane through a central peripheral line on the gear face. In other words, the cutting edge of each tooth at the completion of the operative stroke of the cutter should lie substantially in a plane, through the center of the gear blank and transverse to the axis thereof. By mechanism to be hereinafter described, I have arranged to so control the cutters that the cutting stroke may cease at the proper time, and I will now describe the contour of the teeth, which I deem preferable to effect the cutting of continuous herringbone teeth of true outline throughout their entire length, even to the apices or meeting edges of the teeth, where the angles should be sharply defined and the metal cleanly cut out, avoiding, however, the fouling by one cutter of the teeth cut by the other.

As shown in Figs. $15^b$ to $15^e$ of the drawings, the cutting edges of each of the teeth, which are designated by the reference characters $41^a$, $41^b$, $41^c$, $41^d$ and $41^e$, and which constitute substantially the entire outline of the end face of the tooth, all lie in substantially the same plane. This plane, as shown in Fig. $15^b$, is substantially parallel to the side of the cutter pinion or a plane at right angles to the shaft, upon which the pinion is mounted, and such an arrangement will, as is obvious, obviate the disadvantageous effect of having one edge of the cutter in advance of the other, in its reciprocating movement, as would be the case if the end face of the tooth was in a plane normal to the sides thereof.

It will be apparent, however, that if the entire end face of the tooth constituted a plane surface transverse to the axis of the cutter pinion, the cutting edge $41^a$ would be formed by two planes meeting at an angle considerably less than a right angle, the difference being determined by the helical angle of the cutter teeth and the cutting edge $41^e$ would be formed by two planes meeting at an angle considerably greater than a right angle. To obviate this disadvantage, I have formed the end face of each of the cutter teeth of such contour that it consists of two substantially plane surfaces $41^f$ and $41^g$, which meet the plane of the upper portion or crown of the gear tooth in the edges $41^b$ and $41^d$, and which are joined by a shoulder $41^h$, which is of considerable width adjacent the base of the tooth and tapers toward the apex thereof until it finally runs out. This formation does not, however, interfere with the arrangement of having the cutting edges all in substantially the same plane transverse to the axis of the cutter, for, as clearly shown in Fig. $15^d$, the surface $41^f$ lies in a plane, which is only slightly less than normal to the side of the tooth, while the surface $41^g$ is cut back to make approximately the same angle with the adjacent side of the tooth. A relief cut is made to provide the relief surface $41^m$ which runs out toward the root or base of the tooth, and which at the crown, terminates in the cutting edge $41^e$, the latter serving to join the edges $41^b$ and $41^d$.

The edge $41^a$ is the forward cutting edge of the gear tooth, or that edge which first comes in contact with the blank during the generating rotary movement of the blank and cutters, which takes place during the cutting operation. It is this edge of each of the cutter teeth that moves into and cleans out the apices of the teeth cut in the blank, and, as shown in Fig. $15^f$, the advancing movement of the cutter ceases when this edge, which, as stated, is in a plane transverse to the blank axis, arrives at the center line of the blank, so as not to foul the other half of the gear tooth formed by the other cutter. As will also be apparent by reference to this figure of the drawings, the edge $41^e$ may be slightly in advance of the edge $41^a$, but as this is the edge adjacent the exterior angles at the apices of the teeth, there will be no danger of this cutting edge fouling the gear tooth on the other half of the blank.

The plane of contact between the cutting edge of one of the cutter teeth, and the blank, is thus substantially a plane at right angles to the axis of the blank and oblique to the general direction of the gear teeth, or the direction of the furrows cut in the gear blank, and likewise oblique to the path of travel of the cutter tooth itself.

Figure 4:
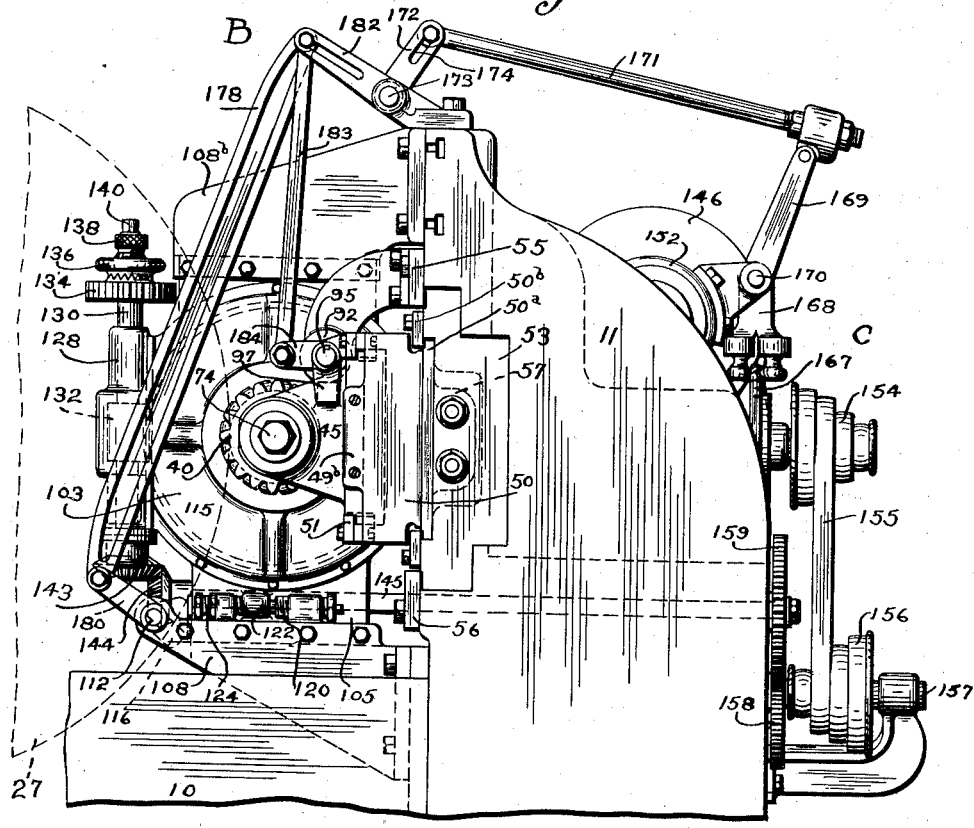
Fig. 4 is an enlarged side elevational view of the cutter spindle and associated parts, taken from the side opposite that of Fig. 3.

As shown in the drawings, these cutters have four distinct movements. The first of these to be described is their reciprocatory movement across the face of the blank. As shown more especially in Fig. 5, the right hand cutter 40 is rigidly mounted upon a sleeve 43, the sleeve being rotatably carried within a bearing 44, of a cutter carriage 45. The left hand cutter is similarly keyed to a sleeve 46, rotatably mounted in a bearing 47, of a second cutter carriage 48. The cutter carriages 45 and 48 are movably mounted in guideways 49, in blocks 50, in which guideways the carriages have a limited movement between end abutments $49^a$ and $49^b$ of the guideways. The carriages 45 and 48 are retained in place in the guideways by means of plates 51 which overlie the upper and lower edges of the carriage bases 52. The supporting blocks 50 are adjustably mounted in a main carriage slide 53, reciprocably mounted in the rear standard 11. This slide is shown more particularly in Figs. 4 and 7, and is secured in the guideway 54 in the standard by means of upper and lower plates 55 and 56. The slide in turn is provided with a guideway $50^a$ in which the blocks 50 are slidably secured by means of the overhanging plates $50^b$.

As shown in Figs. 6 and 7, the left hand carriage block is provided with a number of rearwardly projecting lugs 57, the right hand carriage block being provided with a similar set of lugs 58. Each of the lugs 57 is provided with a threaded opening 59, in which is engaged a threaded rod 60, rotatably mounted at its opposite ends in the main carriage slide 53, and with a larger opening 61, through which loosely passes a threaded rod 62, the latter rod being rotatably mounted in the slide and threadedly engaged with opening 63 in the lugs 58. The lugs 58 are also provided with openings through which the rod 60 loosely passes. As shown at 64 and 64ª in Fig. 3, the rods 60 and 62 are provided with squared projecting ends, upon which may be used a socket wrench or the like, to rotate the rods and adjust the distance at which cutters 40 are set from each other. In this way, the cutters may be adjusted for different size blanks, as it will be obvious that in order to operate satisfactorily, the cutters must not be set closer together than a distance equal to one-half the width of the peripheral face of the blank. In other words, when one cutter is at the middle of the blank or at the extreme end of its cutting operation, the other cutter should clear the edge of the blank so that upon the return stroke a complete cut across the adjacent half of the peripheral face of the blank will be effected.

Figure 10:
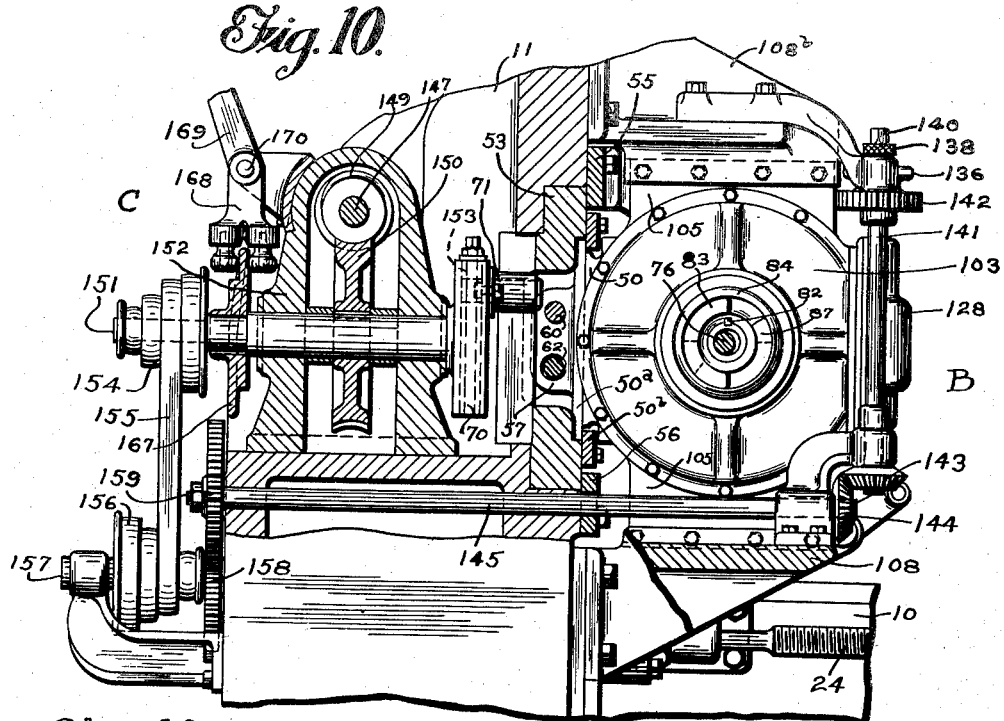
Fig. 10 is a sectional view on line 10—10 of Fig. 2.

To impart a reciprocatory movement to the cutters, so that they will be moved across the face of the blank, I employ a crank 70, shown more particularly in Figs. 2 and 10 of the drawings, this crank being provided with a crank pin 71, engaged with the adjacent end of the slide 53. It will be apparent that when the crank is rotated by suitable mechanism, to be hereinafter described, the slide 53 will be reciprocated, and as this slide controls the position of the cutters through the agency of the cutter carriages 45 and 48, with their bearings 44 and 47, the cutters themselves will be given a reciprocating movement.

At the same time that the cutters are reciprocated across the face of the work, they are also given a twisting or helical motion, if it is desired to cut helical teeth upon the gear blank. The preferred mechanism for imparting this motion to the cutters will now be described.

The sleeve 43, upon which the right hand cutter 40 is mounted, is secured by means of a bolt 74 and clutch fingers 75, to the end of a spindle or shaft 76, this spindle passing through the sleeve 46 of the left hand cutter and having secured upon its left hand end a helical guide 77, by means of the key 77ª and a nut 77ᵇ threaded upon the end of the shaft. The helical guide 77 is slidably mounted within the hollow hub or sleeve 78 of a worm wheel 79, and to this hub is secured a helical nut 80, co-operating with the helical sleeve or guide 77.

Likewise, the sleeve 46 upon which is rigidly mounted the left hand cutter, is keyed as shown at 82, in Fig. 14, to the right hand end of a helical guide 83, slidably mounted in the hollow hub 84, of a second worm wheel 85. A helical guiding nut 87, similar to the nut 80, is secured upon the inner surface of the hollow hub 84.

It will be noted that the shaft 76 not only passes loosely through the collar 46, but also passes loosely through a collar 86 in the rear end of the helical guide 83, within the hub 84. As will be hereinafter explained, the worm wheels 79 and 85 are secured against movement in a direction longitudinally of the shaft 76, and the helical guiding nuts 80 and 87 secured to the hubs of these wheels are likewise fixed against such movement. It will be obvious, therefore, that when the slide 53 is reciprocated, carrying with it the cutter carriages 45 and 48, and the helical guiding sleeves 77 and 83, that the sleeves 43 and 46 upon which the cutters are mounted, will, due to the camming action of the guiding nuts 80 and 87 upon the helical sleeves 77 and 83, impart to the cutters a twisting helical motion as they are reciprocated across the face of the work. The cutters will, of course, be twisted or moved helically in one direction during the operative or cutting stroke of the cutters, and will be moved in the opposite direction during an inoperative stroke, so that the teeth of the cutters will be properly backed out of the helical grooves which have been cut.

It has been found desirable, particularly in cutting straight gears and in cutting gears in which the angle of the helix is relatively small, to provide a way to relieve each of the cutters at the end of each operative stroke so that when the cutter is being backed out from the work, the cutting edge will not drag thereupon. The means by which this is accomplished will now be described.

As has been previously described, the cutter carriages 45 and 48, are mounted in guideways in the blocks 50. As shown in Fig. 6, these guideways are inclined relatively to the axis of the cutters and as the carriages have a limited movement longitudinally of the guideways, it will be apparent that the carriages and thus the cutters, may be moved toward and away from the work to a limited extent. As shown in Fig. 6, the left hand cutter is practically at the end of its operative stroke, and the carriage 48 is at the left hand end of the corresponding guideway 49, against the abutment 49ᵇ, or in that position in which the cutter is forced against the work to the greatest extent. The carriage is urged to this position by means of a spring 90, which reacts against the abutment 49ª, and the carriage 45 is likewise urged toward the abutment 49ᵇ of its guideway, by means of a similar spring 91. With the parts in the position shown in Fig. 6, it will be necessary to provide some means to force the carriage 48 to the right, against the tension of the spring 90, in order to move the shaft of the left hand cutter away from the work, so as to relieve this cutter upon the return or movement toward the left, which is just about to begin. To effect this movement, I have mounted in the bearing 92, upon the main frame, and bearings 93 and 94 upon the upper plates 51, a shaft 95. To this shaft are keyed a pair of camming fingers 96 and 97 adjacent the bearings 93 and 94, the camming fingers being attached to these bearings so that they are moved longitudinally of the shaft 95, as the cutter carriages and cutters are reciprocated. As shown more particularly in Figs. 11 and 12, the camming finger 96 is provided with a cam surface 98 coacting with the complemental cam lug 99, which may be integrally formed with the carriage 48 to urge this carriage against the abutment 49$^a$, against the action of the spring 90, when the shaft 95 is oscillated. It will, of course, be obvious that when the shaft is returned to its original position, the carriage 48 will be again moved against the abutment 49$^b$ by the spring 90. Likewise, the cam finger 97 is provided with a camming surface 100, co-acting with a cam lug 101 on the carriage 45, to force this carriage away from the work against the action of the spring 91.

Figure 11:
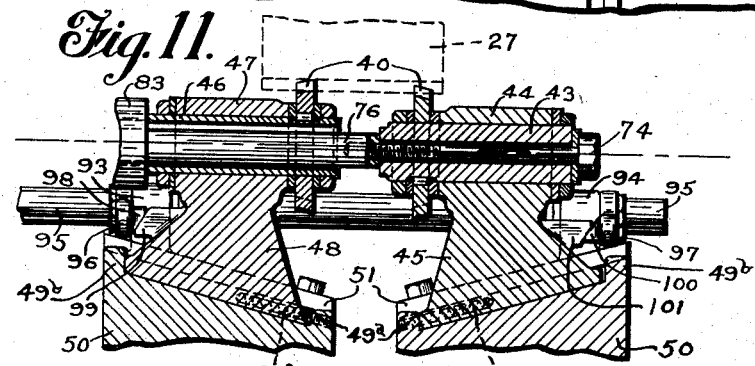
Fig. 11 is a sectional view through the cutter carriages, on line 11—11 of Fig. 1, showing the positions of the cutter carriages as they are being moved toward the right, in this figure.
Figure 13:
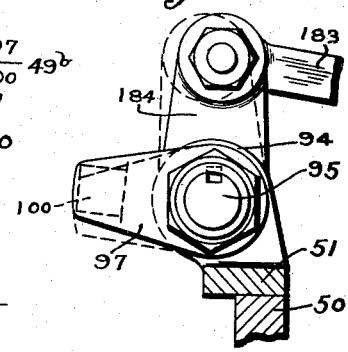
Fig. 13 is a side elevational view of the cam mechanism for assisting the relief of the cutters during their operation.
Figure 12:
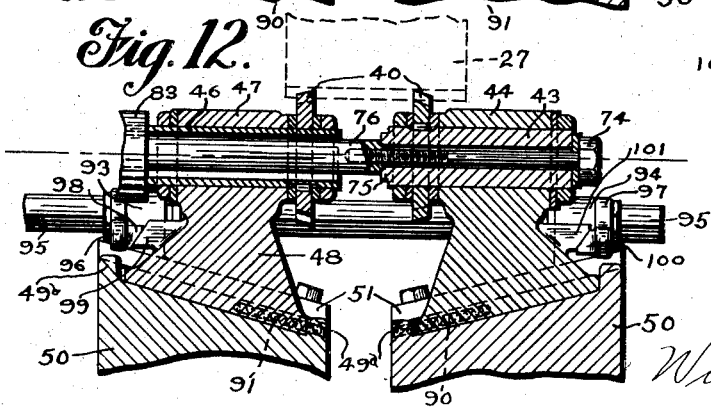
Fig. 12 is a view similar to Fig. 11, showing the position of the cutter carriages as they are moving in the opposite direction or toward the left, in this figure.

As shown in Fig. 11, the cutters are being moved toward the right and it will be noted that the left hand cutter, which is accomplishing its operative stroke, is being held closely against the work, while the right hand cutter, which is being backed out, is relieved or being held slightly away from the work. In Fig. 12, where the movement of the cutters is in the opposite direction, the positions are reversed and the left hand cutter is relieved, while the right hand cutter is held closely against the blank.

It will be obvious that in the illustrated embodiment of my invention a translatory relieving movement is imparted to the cutters, the term translatory being used to describe a movement in which all points of the moving body move in parallel straight lines, as distinguished from a rotative or pivotal movement.

It will be apparent that when the cutters are moved toward and away from the work, in order to relieve them upon their inoperative movements, provision must be made for permitting corresponding movements of the shafts upon which these cutters are operated. The shaft 76 of the right hand cutter, which passes through the sleeve 46, which supports the left hand cutter, is provided with sufficient clearance within this sleeve, to permit the slight bodily movement which is necessary for clearance, and similar movement is also permitted within the collar 86. The helical guides 77 and 83 are, however, closely fitted within the hubs 78 and 84 of the worm wheels 79 and 85, and it is, therefore, necessary to provide for a bodily movement of these wheels. For this purpose, the wheels are mounted within casings 102 and 103, shown more particularly in Fig. 14, which casings are provided at their upper and lower portions with guiding tongues 104 and 105, mounted in guideways 106 and 107, in upper and lower supports 108, 108$^a$ and 108$^b$, carried by the main frame. By referring to Fig. 8, it will be apparent that the casings 102 and 103 will thus have a limited movement in the guideways 106 and 107, toward and from the rear standard 11. These casings 102 and 103, are provided with hub portions 109 and 110, in which the gear hubs 78 and 84 are rotatably mounted. To move the casings toward the standard 11, when the cutters are relieved from the work, short shafts 111 and 112 are mounted in journals 113 and 114, upon the lower support 108 and to these shafts are secured cam fingers 115 and 116, adapted to engage projections 117 and 118, upon the casings 102 and 103. The shafts 111 and 112 are oscillated by mechanism to be hereinafter described and as these shafts are simultaneously operated in the same direction, the cams 115 and 116 are disposed upon these shafts at an angle of approximately 90 degrees to each other. The return movement of the casings 102 and 103, is accomplished by means of spring pressed plungers 119 and 120, which act against lugs 121 and 122 on the respective casings. The return movement of these casings is limited by stop screws 123 and 124, which are adjustable in lugs upon the support 108.

Having now described the mechanism by which are imparted to the cutters their reciprocatory movement across the face of the work, their bodily movement by which they are relieved at the end of the cutting stroke, and their twisting movement by which they are enabled to cut teeth of helical shape, I will now describe the mechanism which imparts to the cutters, a continuous rotary motion of the same peripheral velocity as that of the blank, due to the action of the worm wheel 33 and worm 35.

In front of the worm wheel casings 102 and 103 are provided worm casings 127 and 128, communicating with the first named casings. These latter casings are provided with vertically disposed bearings, in which are mounted shafts 129 and 130. Upon these shafts are secured the worms 131 and 132, the teeth of which engage the teeth of the worm wheels 79 and 85, respectively. The upper ends of the worm wheel shafts project from the casings and upon the projecting ends of these shafts are loosely mounted pinions 133 and 134. These pinions are engaged with the shafts upon which they are mounted, by means of clutch members 135 and 136, slidably keyed to the shafts 129 and 130, and adapted to be held in engagement with coacting upper clutch faces on the hubs of the gears 133 and 134, by means of threaded nuts 137 and 138. When the nuts have been loosened and the clutch members released, the shafts 129 and 130 may be turned by means of a wrench or the like, applied to their upper squared ends 139 and 140, and by this means the cutters may be individually rotated in order to adjust them to the proper relative positions. It will, of course, be obvious that the teeth of the two cutters must be properly set, in order that they may cut continuous double helical teeth on the gear blank. Between the shafts 129 and 130 is mounted in suitable journals, a third vertical shaft 141 and to this shaft is secured, adjacent its upper end, a spur pinion 142, the teeth of which are in engagement with those of the gears 133 and 134. The shaft 141 is provided at its lower end with a bevel gear 143, the teeth of which mesh with those of a bevel gear 144, upon a shaft 145, shown more particularly in Fig. 10. When the machine is in operation, the shaft 145 is continuously rotated by means to be hereinafter described, and this rotating movement is transmitted through the shaft 141, and the spur pinion 142 to the gears 133 and 134, shafts 129 and 130, and through the worms 131 and 132 to the worm wheels 79 and 85, and thence to the cutters.

Power is supplied to the machine in the embodiment shown in the drawings, by means of a pulley 146, secured upon a shaft 147, rotatably mounted in journals on the standard 11, and in a bracket 148 secured to this standard. As shown more particularly in Figs. 2 and 10, a worm 149 is secured upon a shaft 147, and is in engagement with a worm wheel 150, secured upon a shaft 151. As shown in Fig. 10, the shaft 151 extends longitudinally of the machine, and its ends project without the journal casing 152, in which it is mounted. To one of the projecting ends of this shaft is secured the crank 70, which operates the slide 53. It is desirable in cutting gears of different widths, to be able to adjust the throw of the slide 53, and to this end, the crank pin 71 may be adjustably mounted upon the crank 70, in any well known way, so that various lengths of movement may be arranged for. I have shown the crank pin slidably mounted in a slot in the face of the crank 70, and adjustable in this slot by means of a threaded rod 153, mounted within the slot in the crank wheel. This particular feature is also shown in my prior Patent No. 1,323,120, granted November 25, 1919.

Upon the other end of the shaft 151, is mounted a pulley 154, about which is passed a belt 155, which also passes about a pulley 156, secured upon a shaft 157, rotatably mounted at the lower portion of the standard 11. Upon the shaft 157 is mounted a pinion 158, which meshes with a gear 159 on the projecting end of the shaft 145 to actuate the latter. The teeth of the pinion 158 also mesh with the teeth of the gear 160, mounted on a stud shaft 161, upon the rear of the standard 11, and to the face of this gear is secured a pinion 162, meshing with a pinion 163 secured to a shaft 164, provided with a bevel gear 165, upon its opposite end and suitably journaled upon the standard 11. The gear 165 may be connected by suitable change gearing, designated generally by the numeral 166, with the shaft 36, in order that this shaft may be continuously rotated upon rotation of the shaft 164, in order to actuate the worm 35 and worm wheel 33, upon the shaft 21, which carries the gear blank. The gear ratio is properly adjusted to rotate the blank at the same peripheral speed as that of the cutters, as has been heretofore stated.

In order that the cutters and their operating mechanism may be given a bodily movement at the proper time, so that the cutters may be relieved at the end of their operative movements, a double acting cam disk 167, is secured upon the shaft 151, as shown in Fig. 10. This disk is engaged at its opposite faces with the bifurcated end 168 of a lever 169, pivoted at 170 upon the main frame. It will be apparent that upon the continued rotation of the shaft 151, the lever 169 will be rocked first in one direction and then in the other, these movements being imparted to it at the end of each half revolution of the shaft.

The lever 169 is connected by a link 171 to a crank arm 172, secured upon a rock shaft 173, mounted in bearings upon the standards 11. The crank arm 172 may be slotted as shown at 174, in order that the throw of this arm and the angle of oscillation of the shaft 173, may be adjusted. Upon the rock shaft 173 are mounted a pair of crank arms 175 and 176 to which are adjustably connected by means of a pin and slot arrangement, links 177 and 178 pivotally connected at their lower ends with crank arms 179 and 180, secured respectively to shafts 111 and 112, upon which are mounted the cam fingers 115 and 116, which actuate the worm wheel casings 102 and 103. To the shaft 173 is also secured a crank arm 182, connected by a link 183 to a crank arm 184, secured upon the shaft 95.

It will, of course, be obvious that at the same time that the bodily relieving movement is given to one of the cutters, the corresponding worm wheel casings 102 or 103 should also be given its bodily movement in the same direction. As this relieving movement is imparted to the cutters by the oscillation of the shaft 95, and as the bodily movement is imparted to the worm wheel casings by the oscillation of the shafts 111 and 112, respectively, and as these shafts are all oscillated upon the oscillation of the shaft 173, which in turn is actuated by the cam 167, it will be apparent that all of these movements will take place synchronously and at the proper time, at the end of each half revolution of the cam 167 and shaft 151.

The operation of the device will now be briefly described.

The blank is placed upon the shaft 21, with the face thereof abutting the edges of the adjustable L shaped guides 29. By means of the crank 23 and the threaded rod connected thereto, the work carriage 15 is then moved bodily toward the cutters, the worm 35 during this movement sliding upon the shaft 36. In setting up the work to the cutters, the shaft 36 may be disconnected from the shaft 164 by any desired means, such as disconnecting the gearing 166 and the machine may be set in operation by applying power to the main pulley 146. The work is then set up until it is barely marked by the cutters 40, and the machine may then be stopped in order that various adjustments may be made. As will be hereinafter explained, the cutters, due to their twisting helical motion will first mark the blank at the central portion thereof, as shown in Fig. 17. The micrometer dial 25 is then set so that at the appointed time the blank may be set further toward the cutters, in order that the correct depth of tooth may be secured.

When the work is barely marked by the cutters, the clutches 135 and 136 may be disconnected and the worm wheels 79 and 85, and therefore the cutters may be rotated by means of wrenches applied to the squared ends 139 and 140 of the shafts 129 and 130, so that the teeth of the cutters will register correctly together, as is, of course, necessary in cutting double helical gears. The clutches are then screwed down so that the driving gears 133 and 134 are again engaged.

For cutting continuous teeth, it is, of course, necessary for the cutters to finish their stroke upon the same line, i. e., at the center of the face of the blank and for this purpose, it is necessary, at this time, to adjust the blocks 50 along the threaded shafts 60 and 62. This adjustment is made with the crank pin 71 on dead center and the throw of the crank is then properly regulated by adjusting the crank pin within the slide in the face of the crank disk, until the cutters will be reciprocated to the proper extent to clear the work at the outer ends of their strokes and to finish their cutting strokes upon the same line, at the center of the face of the blank.

The shaft 36 may again be connected with its drive gearing and the device again set into operation. The carriage carrying the blank is again moved gradually toward the work by means of the crank 23, the movement now being gauged by the micrometer dial 25, so that the work may be set up in proper relation to the cutters, in order that the latter may cut a tooth of the required depth.

As will be obvious, the teeth of the cutters due to the twisting helical motion of the latter imparted by the helical guides 77 and 83 and cooperating nuts 80 and 87, will not at the beginning of the operation mark and cut the surface of the blank across its entire face, the cut taking place at the point upon the surface of the blank which lies in a plane passing through the axes of the blank and cutter, or, in other words, where the apex of a tooth is tangent to the surface of the blank. Due to the twisting movements of the cutters, one of the teeth which, for example, is tangent to the blank at the edge thereof, during the first part of the stroke, will be rotated toward the observer, as shown in Fig. 17, and will, therefore, be moved out of contact with the blank before the stroke is completed. Likewise, a following cutter tooth, which will not engage the blank at the beginning of the stroke, will engage it during the latter part of the stroke, or at a point adjacent the center of the blank, due to the fact that the helical motion imparted to the cutter brings it to a position in the plane passing through the axes of the blank and cutter where such engagement takes place. In other words, the teeth first engage the blank when they are in the plane passing through the axes of the cutter and blank, and as their helical motion carries them across or out of this plane they will not at first mark the blank across the full width of the face. As the operation progresses the cut may become so deep at one point of the gear that a continuous cut across one-half the face of the blank will be made during a single stroke of the cutter before the tooth "runs out" of the groove being cut. It will be understood, however, that such a cut will be considerably deeper in one place than another, depending upon the direction of the rotating feeding movement of the cutter and blank. When the feeding motion takes place in the direction shown by the arrows in Figs. 23 and 24 of the drawings, each tooth will be formed from the center of the blank outwardly and, as shown in these figures, the partially formed teeth will be deeper at the center of the blank than at the edge.

It will be understood that while the teeth make their deepest incisions at a point on the blank directly opposite the work-shaft, or in a plane passing through the axes of the cutter and blank, the rotative feeding movement of the cutter and blank will bring each point on the gear blank into the zone where the maximum penetration of the cutter tooth into the blank takes place, or where the deepest cut is made; and that, while the cutter only notches the blank at the central part thereof at the beginning of a new tooth, the completion of the cutting of such a tooth will be left to the action of the cutter teeth during successive strokes of the cutter while the rotative feeding motion referred to is effected.

This rotative feeding motion of the cutter and blank should not be confused with the helical twist imparted to the cutter by the helical guides and the cooperating guiding nuts, which alone determines the helical path of the cutter on the blank and the helical angle of the formed tooth. The feeding motion is merely to bring each part of the blank into the zone of action of the cutters, and as the blank and cutter move at the same peripheral speeds as far as this motion is concerned, the helical path of the cutter is exactly the same as though the feeding motion were stopped. It also will be obvious that each cutter tooth reciprocates in one groove in the gear blank, and never operates in another groove until the cutter has made a complete revolution, the teeth of the cutter meshing with the formed teeth in the blank in a manner similar to the meshing of the teeth of a gear and pinion. Due to the relatively slow rotative feeding movements of the cutter and gear, as compared with the speed of reciprocation of the cutters, each cutter tooth will be given a plurality of strokes in the groove being cut in the blank while the latter is passing through the zone of operation wherein the cutting movement takes place.

When the cutters have reached the limit of their operative strokes, they are moved bodily away from the work in order that they may be relieved upon the return strokes, as hereinbefore explained. It will be understood, that the reciprocating movement of the blocks 50, carried by the main slide 53, is imparted to the cutter carriages 45 and 48 by the engagement of these carriages with the abutments 49ª and 49ᵇ, of the inclined guideways 49, in which the carriages are mounted. The action of the camming fingers 96 and 97 is so timed and adjusted that when the cutters have reached the end of their operative strokes, the respective cams will come into action, and while not necessarily moving the cutter carriages to increase the length of the cutting stroke, they will preferably hold the cutter carriages against a return movement until the blocks have been moved sufficiently to cause the carriages to rest against the inner abutments 49ª of the guideways 49. For instance, when the left hand cutter is, as shown in Fig. 6, substantially at the center of the blank and is about to begin its return inoperative stroke toward the left, the cam 96 will come into action against the co-acting cam surface 99, and will tend to move the carriage 48 to the right relative to the block 50, at approximately the same speed longitudinally of the shaft 95, that this shaft and the main carriage slide 53 is being moved toward the left. In other words, the carriage 48, being urged toward the right, as shown in Fig. 6, against the spring 90 at the same velocity as the main slide is being moved toward the left, will remain in a stationary position relative to the work until the limit of the action of the cam 96 has been reached, when the carriage 48 will have reached approximately the opposite side of the guideway 49, where it will be moved toward the left by the abutment 49ª of the block 50. This movement of the carriage 48, in the inclined guideway 49 will, of course, result in the cutter being given a bodily movement in a direction away from the work and it will thus be relieved from the work on its return stroke. It will be understood, however, that viewed with relation to the fixed bed of the machine, the carriage 48 is held in a stationary position and the block 50 moved relatively thereto by the slide 53. As the relief of the cutters, however, is accomplished by a relative movement of the carriage 48 and block 50, a reverse arrangement may be provided wherein the carriage may be moved to the right, and the block 50 held stationary without departing from the principle of my invention.

When the parts have been properly adjusted, as described above and the machine set in operation, the cutting of a gear will proceed continuously as shown more or less diagrammatically in Figs. 19 to 24, until the operation is completed. If desired, the machine may be kept in operation and the cutters made to go over the work a second time, in order that the gear teeth may be properly and correctly trimmed by the cutters at a time when the latter meet with very little resistance and may, therefore, make a truer cut.

The helical movement imparted to the cutters causes them to follow the lead of the gear to be cut, and if straight teeth are to be cut, it will, of course, be necessary to use straight guides.

The helix angle of the gear teeth is, of course, determined by the helical guides secured to the cutter spindles, although this angle may be varied to some extent by the size of the cutters used. For instance, I prefer to adopt a helix angle of 30°, but by using larger or smaller cutters, this angle may be varied approximately 5° more or less, than the preferred angle specified. In other words, by varying the size of the cutters, I may secure a helix angle of from 25 to 35°, for the gear teeth.

The machine herein described has a very considerable scope of utility so far as concerns the dimensions of the gears that can be cut thereby. Fig. 2, for example, shows the machine in process of cutting a large gear several feet in diameter, and Figs. 19 to 26 show the production of a pinion of say 2″ diameter. A typical example of marine turbine gears cut by the machine herein described, is as follows:

Transmitting 2500 H. P. with the primary pinion running at 4800 R. P. M. the smallest pinion of the set was of 5 in. diameter, 14 in. face and 5 diametral pitch, while the largest was 50 in. in diameter, 18 in. face and 3 diametral pitch. With a machine such as herein described, a 0.5 per cent carbon steel pinion of 14 teeth, 5 diametral pitch and 8 in. wide, can be cut in about one hour. Wheels of cast iron, 6 in. wide and 45 in. in diameter, take about 7 hours. Cast steel wheels 50 in. in diameter and of 16 in. face and 3 diametral pitch are cut in 14 hours. Rolling-mill pinions, integral with 9 in. shaft, of 0.7 Mn and 0.5 per cent carbon steel, 25 teeth of 1¾ in. pitch take about 9 hours each. 48 in. turbine reduction gears with 18 in. face, of a maximum degree of accuracy take about 24 hours each.

It will be obvious from the foregoing description that my improvements which relate to the generation of continuous double helical teeth on solid gear blanks do away with the cut or groove at the center line of the gear face which was an incident to the production of aligned double helical teeth prior to my invention, so that the gear can be of less size and weight while at the same time the teeth offer greater resistance to breakage and present increased bearing surfaces relatively to the side of the gear, thus providing for greater load carrying capacity in a gear of given dimensions. On the other hand, the production of continuous double helical teeth by my method is much more simple and satisfactory than the previous practice of bolting together two single helical gears to form double helical teeth without a gap or groove. By the method described, a considerable amount of latitude of the helical angle being permitted, as above described, without alteration of the helical guides, and a still further latitude being permitted, if desired, by the substitution of different helical guides, it will be obvious that I am enabled to produce gears having continuous double helical teeth that are located at a large variety of angles to the blank axis. Nevertheless, I prefer to make the tooth angle approximately 30° and have in fact adopted that as standard practice in the carrying out of the improved machine, having ascertained by considerable experiment that in a large majority of cases, such angle gives the best results in actual use, owing to the fact that such angle prevents slipping so far as necessary, while retaining the full benefit of the helical principle, i. e., maintaining a continuous contact of cooperating intermeshing teeth on the pitch line and a continuous contact between the intermeshing gear elements at all times. In other words, the helical angle should amount to at least 25°, which is larger than the angle customarily found heretofore in double helical gears of various kinds, and should not exceed an upper limit of 35°, although in my experience, the 30° angle has proved to be the best of all, as best suited to the greatest number of conditions, and as best meeting the requirements in respect to continuity of action and prevention of slippage. I have, of course, taken into consideration the fact that the end thrust is increased by the employment of such a large helical angle as described; but this condition has been met or compensated for to a sufficient degree, in double helical gears produced as herein described, owing to the junction of the teeth of the two series at the median line of the face, and the fact that at the apices the teeth present the same full profile as is presented elsewhere, whereby the strength of the gear is markedly increased in comparison to prior gears of the same general class. The improved method combines with these advantages, that of permitting the production of gear tooth shapes which are very strong, without undercut, and having a full bearing surface. When the finished gear is taken out of the machine, the profile of each tooth will be found to be the same throughout the tooth length, i. e. from one side edge of the gear to the other, the apices of the helical angles being completely finished and as cleanly and as accurately cut as the remaining portions of the tooth surface, the teeth of such double helical gears having convex side faces extending from the pitch circle completely to the base circle and being true involute teeth corresponding in shape with those of the cutter. It will be apparent, however, that in some aspects of the invention the shape of the cutter is not material.

It will be understood that, while I have described and illustrated a preferred embodiment of my invention, it is susceptible to changes, and may be varied in details in many respects, without departing from the spirit of the invention and the scope of the appended claims.

In this application, which is a continuation in part of my copending application, Serial No. 484,713, filed July 14, 1921, I make no claim to the method of cutting gear teeth set forth herein, as this method forms the subject matter of my copending application Serial No. 641,125 filed May 24, 1923; nor do I claim per se the specific features of the cutter shown and described herein, which forms the subject matter of my copending application, Serial No. 641,128 filed May 24, 1924; nor do I claim specifically the mechanism for supporting the gear blank, nor other features which form the subject matter of my copending application, Serial No. 641,127 filed May 24, 1923.

What I claim is:

1. In a machine for cutting gear teeth, a support for a gear blank, a cutter operatively mounted for reciprocatory planing movement and for movement of rotation, means for rotating the cutter and causing the face of the blank to be traversed by the cutter, and means for positively imparting to the cutter a translatory relieving movement in a direction away from the work.

2. A machine for cutting continuous double helical teeth in a gear blank comprising a support for the blank, cutters, means for moving the cutters alternately across the face of the gear blank from the opposite sides thereof, and means for alternately moving the cutters directly away from the gear blank in a direction at right angles to the axis of the blank to relieve them before the return strokes thereof.

3. A machine for cutting continuous double helical teeth upon a gear blank comprising means for supporting the blank, cutters, means for moving said cutters across the face of the blank in a helical path in both directions, and means to effect a translatory relieving movement of the cutters at the completion of their respective cutting strokes in a direction away from the work.

4. A machine for cutting helical gear teeth, including a cutter mounted for reciprocatory movement across the face of the gear blank, for twisting movement and for a translatory relieving movement in a plane transverse to its axis, and means for positively effecting a translatory relieving movement of the cutter in a direction away from the work at the end of the cutting stroke.

5. A machine for cutting helical gear teeth including a reciprocatory planing cutter mounted for translatory relieving movement in a direction away from the work at substantially right angles to the line of cut, and means for positively effecting such translatory relieving movement of the cutter at the end of its cutting stroke.

6. A machine for cutting helical gear teeth including a cutter, an operatively mounted shaft upon which the cutter is mounted, means for moving said shaft longitudinally through its mounting and coacting means upon the cutter shaft and shaft mounting to guide the former in a helical path.

7. A machine for cutting helical gear teeth including a pair of cutters, shafts upon which the cutters are mounted journaled for longitudinal and rotating movement in the same direction, and means upon the journals and shafts for imparting a helical motion to the latter.

8. A machine for cutting helical gear teeth including a cutter, a shaft upon which the cutter is mounted, said shaft being mounted for translatory movement longitudinally of its axis, means for imparting such longitudinal movement to the shaft relatively to its mounting and coacting guiding means upon the cutter shaft and its mounting to impart to the former a twisting motion.

9. A machine for cutting helical gear teeth including blank supporting means, a cutter, a shaft upon which said cutter is mounted, a sleeve through which said shaft passes, and coacting means upon said sleeve and shaft to impart a twisting movement to the latter.

10. A machine for cutting helical gear teeth including a blank support, a cutter, a spindle upon which said cutter is mounted, a guide upon said spindle, means mounting said spindle for a reciprocating movement longitudinally of its axis, and means upon said mounting means cooperating with said guide to impart a twisting movement to the cutters.

11. A machine for cutting helical gear teeth including a blank support, a pair of cutters, spindles upon which said cutters are mounted, said spindles extending in the same direction from said cutters and being mounted for translatory movement in a direction transverse to their axes and for reciprocatory movement across the face of the blank.

12. A machine for cutting helical gear teeth including a blank support, a pair of cutters, spindles upon which said cutters are mounted, one of said spindles being hollow and the other passing therethrough, and means mounting said spindles for reciprocatory movements and for translatory movements in a direction transverse to their axes, and means to rotate said cutters in the same direction.

13. A machine for cutting helical gear teeth including a blank support, a pair of cutters, spindles upon which said cutters are mounted, means to rotate said spindles in the same direction, one of said spindles being hollow and the other passing therethrough, the bore of said hollow spindle being sufficiently large to permit relative bodily movements of said spindles in a direction transverse to the axes, and means to effect such movements to move the cutters relatively to the blank.

14. A machine for cutting helical gear teeth including a blank support, a pair of cutters, spindles upon which said cutters are mounted, one of said spindles being hollow and the other passing therethrough, and means mounting said spindles for reciprocatory movements relatively to their mountings and also independent translatory movements, the latter movement being in a direction transverse to the spindle axis.

15. A machine for cutting helical gears comprising a blank support, a pair of cutters, spindles upon which said cutters are mounted, one of which is hollow and the other spindle passing therethrough, and means mounting both ends of each of said spindles for independent translatory movement in a direction transverse to the spindle axes.

16. A machine for cutting helical gears comprising a blank support, a pair of cutters, spindles upon which said cutters are mounted, one of which is hollow and the other spindle passing therethrough, means mounting both ends of each of said spindles for independent translatory movement in a direction transverse to the spindle axes, and means to effect such movement of the spindles at a predetermined time in the operation of the machine.

17. In a machine for cutting helical gears, a main frame, a blank support on the frame, a pair of cutters, spindles upon which the cutters are mounted, both ends of said spindles being operatively mounted in bearings upon the machine frame, and said bearings being mounted for bodily movement in a direction transverse to the spindle axes.

18. In a machine for cutting helical gears, a main frame, a blank support operatively mounted on the frame, a cutter supporting means slidably mounted on said frame, a pair of cutters operatively mounted on said supporting means, means to reciprocate said cutter support to move the cutters across the face of a blank carried by the blank support, and means for imparting to each cutter a bodily movement longitudinally of said support at the end of the cutting stroke.

19. A machine for cutting helical gear teeth, including a blank support, a pair of cutters, spindles upon which the cutters are mounted, one of said spindles being hollow and having the other mounted therewithin for movement transverse to its axis at both ends thereof.

20. A machine for cutting helical gear teeth, including a blank support, a pair of cutters, spindles upon which said cutters are mounted, one of said spindles being hollow and having the other mounted therewithin, said inner and outer spindles having a clearance space therebetween for independent movements transverse to their axes at both ends thereof.

21. A machine for cutting helical gear teeth, comprising a blank supporting means, cutters, spindles upon which said cutters are mounted, means to rotate said spindles in the same direction and means to move said spindles bodily in a direction transverse to their axes and away from the blank to relieve the cutters from the work, and means to impart a twisting movement to the spindles to effect a cut over a helical path on the gear blank.

22. In a machine for cutting helical gears, a frame, a blank support operatively mounted thereon, a reciprocating cutter carrier, a cutter operatively mounted thereon, and means including a lost motion connection between said carrier and cutter to impart a bodily relieving movement to the cutter on said reciprocating carrier.

23. A machine for cutting helical gears, comprising a blank support, a reciprocating cutter carrying slide, and a cutter operatively mounted thereon, said cutter having a movement in a plane transverse to the path of the slide to relieve it from the blank and means to cause said cutter to reciprocate in a helical path.

24. A machine for cutting helical gears comprising a blank support, a reciprocating cutter carrying slide, a cutter journaled thereon for twisting movements during said reciprocation, means to permit a bodily movement of the cutter toward the slide without varying the angular relation of the cutter axis to the slide.

25. A machine for cutting helical gears, comprising a frame, a blank support operatively mounted thereon, a reciprocating cutter carrier, and cutters operatively mounted on said carrier, and means to effect a translatory movement of the cutters in an oblique direction relative to and toward the carrier.

26. A machine for cutting helical gears, comprising a work support, a reciprocating cutter carrier, and cutters operatively mounted thereon, and means to move said cutters in a direction transverse to the path of travel of, and relatively to, the carrier to relieve the cutters from the work.

27. A machine for cutting helical gears, comprising a blank support, a reciprocating cutter carrier, and cutters operatively mounted on the carrier, said cutters being movably connected with the carrier to permit movement in a direction transverse to the path of travel of the carrier.

28. A machine for cutting helical gears, comprising a work support, a reciprocating cutter carrier, and cutters mounted on said carrier for a translatory movement relatively thereto and in a direction transverse to the path of travel thereof to relieve the cutters from the work.

29. A machine for cutting helical gears, comprising a frame, a blank support operatively mounted thereon, a reciprocating cutter carrier provided with inclined guideways, cutters, and means mounting said cutters for movement along said guideways relatively to the carrier.

30. A machine for cutting helical gears, comprising a blank support, a reciprocating cutter carrier having inclined guideways, cutters, means mounting said cutters for movement along said guideways, and means on the cutter carrier to effect relative movement between the cutters and cutter carrier to move the cutters in a direction away from the work.

31. A machine for cutting helical gears comprising a frame, a blank support operatively mounted thereon, a reciprocating cutter carrier provided with guideways, cutters carried by said carrier through successive reciprocating strokes in engagement with a blank to be cut, means mounting said cutters for movement along said guideways, and means to effect relative movement between the cutters and cutter carrier on said guideways at a predetermined time in the operation of the machine.

32. A machine for cutting helical gears comprising a frame, a blank support operatively mounted thereon, a reciprocating cutter carrier provided with guideways, cutters, means mounting said cutters for movement along said guideways, and means to effect independent relative movement between the cutters and cutter carrier at a predetermined time in the operation of the machine.

33. A machine for cutting helical gears comprising a blank support, cutters, means for reciprocating said cutters alternately across the face of the blank to and from a median line thereupon, and means for positively effecting a translatory relieving movement of each cutter independently before the beginning of its return stroke.

34. A machine for cutting helical gears comprising a blank support, a reciprocating cutter carrier, a pair of cutters mounted on said carrier for bodily adjusting movements lengthwise of the carrier, and for additional bodily movements on the carrier in a plane transverse to the path of the carrier to effect the relief of the cutters from the work.

35. A machine for cutting helical gears comprising a blank support, a reciprocating cutter carrier, a pair of cutters mounted on said carrier for bodily adjusting movements lengthwise of the carrier, and for bodily movements in a direction transverse to the axes of the cutters to relieve the cutters from the work, said cutters having their axes parallel to the direction of movement of the slide.

36. A machine for cutting helical gears comprising a blank support, a reciprocating cutter carrier, a pair of cutters mounted on said carrier for independent bodily adjusting movements lengthwise of the carrier, and for additional bodily movements on the carrier in a plane transverse to the path of the carrier to effect the relief of the cutters from the work.

37. A machine for cutting helical gears comprising a blank support, a reciprocating cutter carrier, a pair of cutters mounted on said carrier for independent bodily adjusting movements lengthwise of the carrier, and for independent bodily movements in a direction transverse to the path of the carrier to relieve the cutters from the work.

38. A machine for cutting helical gears comprising a blank support, a reciprocatory slide, members mounted on said slide for longitudinal adjustment in the direction of the movement thereof, and cutters mounted on said members for translatory movement relative thereto in a direction transverse to the movement of the slide.

39. A machine for cutting helical gears comprising a blank support, a reciprocatory slide, members mounted on said slide for longitudinal adjustment in the direction of the movement thereof, and cutters mounted on said members for movement relatively thereto in a direction transverse to the direction of movement of the slide.

40. A machine for cutting helical gears comprising a blank support, a reciprocatory slide, members mounted on said slide for longitudinal adjustment in the direction of the movement thereof, and cutters slidably mounted on said members for translatory movement relative thereto.

41. A machine for cutting helical gears comprising a blank support, a reciprocating slide, members mounted on said slide having ways therein, cutter supports movably mounted in said ways, and cutters carried by said cutter supports.

42. A machine for cutting helical gears comprising a blank support, a reciprocatory slide, bearings carried by said slide, spindles mounted in said bearings and having cutters mounted thereon with their axes parallel to the axis of the blank support, said spindles being mounted for bodily movements toward and from the slide.

43. A machine for cutting helical gears comprising a blank support, a reciprocatory slide, bearings carried by said slide, spindles mounted in said bearings with their axes parallel to the axis of the blank support and having cutters mounted thereon, and means to effect a bodily movement of said spindles toward and from said slide.

44. A machine for cutting helical gears comprising a frame, a blank support, and a cutter carrying slide mounted on the frame, bearings upon said slide, spindles mounted in said bearings and also in other bearings on the frame, and cutters mounted on said spindles, said slide bearings and said frame bearings both being movable in a direction transverse to the spindle axes.

45. A machine for cutting helical gears comprising a frame, a blank support, and a cutter carrying slide mounted on the frame, bearings upon said slide, spindles mounted in said bearings and also journaled upon another part of the frame, cutters mounted on said spindles, said slide bearings and said frame journals both being movable in a direction transverse to the spindle axes, and means to impart a reciprocatory and twisting movement to said spindles.

46. A machine for cutting helical gears comprising a frame, a blank support, and a cutter carrying slide mounted on the frame, bearings upon said slide, spindles mounted in said bearings and also journaled upon another part of the frame, cutters mounted on said spindles, said slide bearings and said frame journals both being movable in a direction transverse to the spindle axes, means to reciprocate said slide, and means to impart a twisting movement to the spindles and cutters.

47. A machine for cutting helical gears comprising a frame, a blank support, and a cutter carrying slide mounted on the frame, bearings upon said slide, spindles mounted in said bearings and also journaled upon another part of the frame, cutters mounted on said spindles, said slide bearings and said frame journals both being movable in a direction transverse to the spindle axes, and means to reciprocate said slide and to impart a twisting and a rotary movement to said spindles and cutters.

48. A machine for cutting helical gears comprising a frame, a blank support, and a cutter carrying slide mounted on the frame, bearings upon said slide, spindles mounted in said bearings and also journaled upon another part of the frame, cutters mounted on said spindles, said slide bearings and said frame journals both being movable in a direction transverse to the spindle axes, means to reciprocate said slide, and means to impart a twisting movement to the cutters and a continuous rotative movement to both the cutters and blank.

49. A machine for cutting helical gears comprising a frame, a blank support rotatably mounted thereon, a reciprocating cutter carrying slide, a bearing mounted on said slide for bodily movement, a bearing member mounted on said frame for bodily movement, a spindle mounted in said bearings, a cutter carried by the spindle, and means for moving said bearings toward and from the slide to vary the distance between the cutter axis and the blank axis.

50. A machine for cutting helical gear teeth including a rotatable blank support, a rotatable spindle, a cutter mounted on said spindle, means for reciprocating said cutter across the face of the blank in the direction of the axis of the spindle, and means for moving the cutter away from the blank without varying the angular relation between the cutter axis and the blank axis.

51. A machine for cutting gear teeth, comprising a support for a gear blank, a cutter carrier having a cutter mounted thereon, means for reciprocating said cutter carrier to move the cutter across the face of the gear blank, means for imparting a helical twist to the cutter during the reciprocating movement, and means for effecting a movement of the reciprocating means away from the cutter carrier at the end of a cutting stroke to cause the cutter to be relieved from the gear blank.

52. A machine for cutting gear teeth, comprising a support for a gear blank, a reciprocating slide, means for operatively mounting a cutter on said slide, said means comprising a lost motion connection between said cutter and slide to permit the relief of the cutter at the end of the cutting stroke.

53. A machine for cutting helical gear teeth including a frame, a blank support, and a cutter carrying slide operatively mounted on the frame, a cutter spindle carried by the slide and having a cutter mounted thereon, a bearing member movably mounted on the frame, said spindle being guided for reciprocatory movement in said bearing member.

54. A machine for cutting helical gear teeth including a frame, a blank support, and a cutter carrying slide operatively mounted on the frame, a cutter spindle carried by the slide and having a cutter mounted thereon, a bearing member movably mounted on the frame, said spindle being guided for reciprocatory twisting movement in said bearing member.

55. A machine for cutting helical gear teeth including a frame, a blank support, and a cutter carrying slide operatively mounted on the frame, a cutter spindle carried by the slide and having a cutter mounted thereon, a bearing member movably mounted on the frame, said spindle being guided for reciprocatory twisting movement in said bearing member, and means for imparting a rotative movement to said bearing member and spindle.

56. A machine for cutting helical gear teeth including a frame, a blank support, and a cutter carrying slide operatively mounted on the frame, a cutter spindle carried by the slide and having a cutter mounted thereon, a bearing member movably mounted on the frame, said spindle being guided for reciprocatory twisting movement in said bearing member, means for imparting a continuous rotative movement to said bearing member and spindle, and means for moving said bearing relatively to said frame to impart a bodily movement to the cutter spindle.

57. A machine for cutting helical gear teeth comprising a blank support, a cutter reciprocable across the face of the blank in a helical path and being capable of a translatory relief movement, means for reciprocating the cutter, and cam means for imparting the relief movement to the cutter.

58. A machine for cutting helical gear teeth comprising a frame, a blank support thereon, a cutter reciprocable across the face of the blank in a helical path, means for reciprocating the cutter, a rock shaft mounted on a frame, and cam means slidable along said shaft for imparting a relief movement to the cutter upon the beginning of the return stroke thereof.

59. A machine for cutting helical gears comprising a blank support, a reciprocable slide, cutters mounted on said slide for translatory movement in a direction generally longitudinally thereof, means for reciprocating the slide, and means for effecting a relative, translatory movement of said cutters and slide at a predetermined time in the operation of the machine.

60. A machine for cutting helical gears comprising a blank support, a reciprocable slide, cutters mounted on said slide for translatory movement in a direction generally longitudinally thereof, means for reciprocating the slide, and automatic means for effecting a relative, translatory movement of said cutters and slide at a predetermined time in the operation of the machine.

61. A machine for cutting helical gears comprising a blank support, a reciprocable slide, cutters mounted on said slide for a translatory relief movement in a direction generally longitudinally thereof, means for reciprocating the slide, and cam means for effecting a relative, translatory movement of said cutters and slide at a predetermined time in the operation of the machine.

62. A machine for cutting helical gears comprising a blank support, a reciprocable slide, two cutters mounted on said slide for independent translatory movement in a direction generally longitudinally thereof, means for reciprocating the slide, and cam means for effecting an independent, relative, translatory movement of said cutters and slide at a predetermined time in the operation of the machine.

63. A machine for cutting helical gears comprising a blank support, a reciprocable slide, cutters operatively journaled on said slide for rotary movement and adapted to be reciprocated with the slide, said cutters also being capable of a translatory relief movement relatively to the slide, cam means for imparting the relief movement to the cutters, said means being movable with the cutters in their reciprocatory movement, and means for operating said cam means to effect the relief of the cutters.

64. A machine for cutting helical gears comprising a frame, a blank support thereon, a reciprocating slide, cutters carried by the slide in a reciprocating movement across the face of the work, cam means for giving said cutters a relief movement, a rock shaft mounted on the frame, said cam means being mounted on said rock shaft to be actuated thereby and being movable with said slide and means for imparting a helical twist to the cutters during the operative stroke thereof.

65. A machine for cutting gear teeth comprising a frame, a blank support thereon, a reciprocating slide, a cutter movable with said slide across the face of the work and being capable of a relief movement away from the work, a rock shaft mounted on the frame, cam means slidable along said shaft for imparting a relief movement to the cutter, and means for imparting a helical twist to the cutter during the operative stroke thereof.

66. A machine for cutting helical gears comprising a blank support, a reciprocable slide, cutter carriers mounted for bodily movement on the slide and reciprocable therewith, cutters carried by said carriers, a rock shaft operatively journaled on the machine, and cam means slidably mounted on said rock shaft and connected to the slide to be moved therewith to effect a relief movement of the cutters.

67. A machine for cutting helical gears comprising a blank support, a reciprocable slide, cutter carriers mounted for bodily movement on the slide and reciprocable therewith, cutters carried by said carriers, a rock shaft operatively journaled on the machine, and cam means slidably and non-rotatably mounted on said rock shaft and connected to the slide to be moved therewith to effect a relief movement of the cutters.

68. A machine for cutting helical gears comprising a blank support, a reciprocable slide, cutter carriers mounted for bodily movement on the slide and reciprocable therewith, cutters carried by said carriers, a rock shaft operatively journaled on the machine, cam means slidably mounted on said rock shaft and connected to the slide to be moved therewith to effect a relief movement of the cutters, and means for rocking said shaft.

69. A machine for cutting helical gears comprising a blank support, a reciprocable slide, cutter carriers mounted for bodily movements on the slide and reciprocable therewith, cutters carried by said carriers, a rock shaft operatively journaled on the machine, cam means slidably mounted on said rock shaft and connected to the slide to be moved therewith to effect a relief movement of the cutters, and means for automatically rocking said shaft at a predetermined time in the operation of the machine.

70. A machine for cutting helical gears comprising a blank support, a reciprocating slide, cutters carried by the slide and movable therewith across the face of the work, a rock shaft operatively journaled on the machine, cam means mounted on said shaft to impart independent, relief movements to each of the cutters, and means for rocking said shaft.

71. A machine for cutting helical gears comprising a blank support, a reciprocating slide, cutters operatively mounted on said slide to be movable therewith across the face of the work, a rock shaft operatively mounted on the machine, cam means on said rock shaft to effect a relief movement of each of the cutters, and means whereby one of said cams is inoperative to effect such movement when another thereof is in an operative position.

72. A machine for cutting helical gears comprising a frame, a blank support and a reciprocating slide mounted on said frame, cutters mounted on said slide and reciprocable therewith across the face of the work, a rock shaft journaled on said frame and slide, and cam means mounted on said rock shaft and staggered radially with respect thereto to effect a relief movement of each of said cutters independently, and means for rocking said shaft.

73. In a machine for cutting helical gears, a frame, a blank support, and a reciprocating slide mounted on said frame, cutters mounted on said slide and movable therewith across the face of the work, said cutters being mounted for movement on said slide in a direction generally longitudinally thereof, means whereby said longitudinal movement effects a relief movement of the cutters, and means for holding said cutters against movement at the end of the return strokes to permit relative movement between them and the slide to effect the relief of the cutters.

74. In a machine for cutting helical gears, a frame, a blank support, and a reciprocating slide mounted on said frame, cutters mounted on said slide and movable therewith across the face of the work, said cutters and slide being relatively movable along an inclined plane to effect a relief movement of the cutters, and means for holding said cutters in a substantially stationary position while the slide is moved relatively thereto to effect said relief movement.

75. A machine for cutting the teeth of double helical gears comprising a frame, a blank support mounted thereon, cutters, means for reciprocating said cutters across the face of the work from the sides of the blank to, but not beyond, a median line thereon, and for withdrawing them directly away from such line and means for imparting a twisting motion to the cutters during the reciprocating movement to form continuous double helical teeth with finished apices.

76. A machine for cutting helical gears comprising a blank support, two cutters, means for sliding the cutters in opposite directions from and to the side edges of the blank face to and from a median line thereon, and means for imparting a twisting action to said cutters and so controlling them that they cut cleanly to, but not beyond, the median line on the blank face to produce continuous herringbone teeth with finished apices and for withdrawing each cutter directly away from such line.

77. A machine for cutting helical gears comprising a blank support, two cutters, means for sliding the cutters in opposite directions from and to the side edges of the blank face to and from a median line thereon, and means for imparting a twisting action to said cutters and so controlling them that they cut cleanly to, but not beyond, the median line on the blank face to produce continuous herringbone teeth with finished apices, and means for relieving the cutters before the beginning of the return stroke thereof.

78. A machine for cutting helical gears comprising a blank support, two cutters, means for sliding the cutters in opposite directions from and to the side edges of the blank face to and from a median line thereon, means for imparting a twisting action to said cutters and so controlling them that they cut cleanly to, but not beyond, the median line on the blank face to produce continuous herringbone teeth with finished apices, and means for imparting a relief movement to the cutters directly away from the work on their return stroke.

79. A machine for cutting helical gears comprising a blank support, two cutters, means for sliding the cutters in opposite directions from and to the side edges of the blank face to and from a median line thereon, means for imparting a twisting action to said cutters and so controlling them that they cut cleanly to, but not beyond, the median line on the blank face to produce continuous herringbone teeth with finished apices, and means for imparting a translatory relief movement to the cutters to move them sharply away from the work upon their return strokes.

80. A machine for cutting the teeth of helical gears comprising a blank support, cutters, means for reciprocating said cutters across the face of the work, means for imparting to said cutters a twisting movement to cut helical gear teeth, means for relieving the cutters at the end of their cutting strokes, and means for maintaining the cutting edge of each of the cutters at all times substantially in a plane transverse to the blank axis.

81. A machine for cutting helical gears comprising a blank support, a cutter, means for reciprocating said cutter across the face of the blank, and means for imparting to said cutter a twisting motion during its reciprocating movement, means for relieving the cutter at the end of its cutting stroke and means for maintaining the cutting edge of the cutter at all times substantially in a plane at an oblique angle to the path of the tool.

82. A machine for cutting helical gears comprising a blank support, a cutter of pinion formation, means for reciprocating said cutter across the face of the work, means for imparting a twisting movement to the cutter to cut helical teeth, and means for maintaining cutting contact between the cutter and blank substantially in a plane transverse to the blank axis, and means for withdrawing the cutter directly away from the work.

83. A machine for cutting helical gears comprising a blank support, a cutter of pinion formation, means for reciprocating said cutter across the face of the work, means for imparting a twisting movement to the cutter to cut helical teeth, means for maintaining cutting contact between the cutter teeth and blank substantially in a plane oblique to the path of travel of the cutter, and means to effect a relief movement of the cutter before the beginning of the return stroke thereof.

84. A machine for cutting helical gears comprising a blank support, a cutter of pinion formation, means for reciprocating said cutter across the face of the work, means for imparting a twisting movement to the cutter to cut helical teeth, means for maintaining cutting contact between the cutter and blank substantially in a plane transverse to the blank axis, and means for imparting a translatory relief movement to the cutter at the end of the cutting stroke.

85. A machine for cutting helical gears comprising a blank support, a cutter of pinion formation, means for reciprocating said cutter across the face of the work, means for imparting a twisting movement to the cutter to cut helical teeth, means for maintaining cutting contact between the cutter and blank substantially in a plane transverse to the blank axis, means for imparting a translatory relief movement to the cutter at the end of the cutting stroke in a direction away from the work, and means for imparting a continuous rotary feeding movement to the cutter and work.

86. A machine for cutting helical gears comprising a blank support, a cutter of pinion formation, means for reciprocating said cutter across the face of the work, means for imparting a twisting movement to the cutter to cut helical teeth, means for maintaining cutting contact between the cutter and blank substantially in a plane transverse to the blank axis, means for imparting a translatory relief movement to the cutter at the end of the cutting stroke, and means for imparting a rotary feeding movement to the cutter and work.

87. A machine for cutting helical gears comprising a blank support, two cutters of pinion formation, means for reciprocating said cutters alternately across the face of the work so that each cutter moves from the side edge of the blank face until it contacts with an abutment or shoulder intermediate of the face, and means for imparting a twisting movement to each cutter to produce a helical cut and withdrawing each cutter directly from such abutment or shoulder.

88. A machine for cutting helical gears comprising a blank support, two cutters of pinion formation, means for reciprocating said cutters alternately across the face of the work so that each cutter moves from the side edge of the blank face until it contacts with an abutment or shoulder intermediate of the face, and means for imparting a twisting movement to each cutter to produce a helical cut and withdrawing each cutter directly from such abutment or shoulder, while imparting to the cutter and blank a continuous generating movement.

89. A machine for cutting helical gears comprising a frame, a blank support mounted on said frame, spindles journaled on said frame, cutters mounted on said spindles and movable across the face of the work, means for simultaneously rotating said spindles comprising a pair of substantially parallel shafts normally geared together, and means for disconnecting said gearing to permit independent rotation of said spindles to adjust the cutters.

90. A gear cutting machine comprising a frame, a blank support mounted thereon, bearings movably mounted on said frame, spindles mounted in said bearings, cutters carried by said spindles, and cam means for simultaneously moving the bearings of one of said spindles in a direction away from the blank to impart a relief movement to the cutters.

91. A gear cutting machine comprising a frame, a blank support thereon, two cutters, spindles upon which the cutters are mounted, a pair of journals in which each of said spindles is mounted, said journals being movably mounted on the frame to effect the relief of the cutters from the work, a rock shaft, and cam means associated with each of said journals and actuated by said rock shaft to effect the movement of said journals in pairs.

92. A machine for cutting helical gears comprising a frame, a blank support mounted thereon, a pair of cutters, a spindle upon which each of the cutters is mounted, each of said spindles being mounted in journals movably mounted on the frame, cam means associated with each of said journals, a rock shaft adapted to actuate the cam means associated with the journals at one end of each shaft, separate cam means adapted to actuate the journals associated with the opposite end of each shaft, a rock shaft mounted on the frame, and means for actuating all of said cam means from said rock shaft.

93. A machine for cutting helical gears comprising a frame, a blank support mounted thereon, a pair of cutters, a spindle upon which each of the cutters is mounted, each of said spindles being mounted in journals movably mounted on the frame, cam means associated with each of said journals, a rock shaft adapted to actuate the cam means associated with the journals at one end of each shaft, separate cam means adapted to actuate the journals associated with the opposite end of each shaft, a rock shaft to actuate one set of cam means, a second rock shaft to actuate the other set of cam means, and a third rock shaft journaled on the frame, and connections to actuate the first and second rock shafts from the third rock shaft.

94. A machine for cutting helical gears comprising a frame, a gear blank support and a reciprocating slide mounted on the frame, a cutter carrier, and means for mounting the cutter carrier on said slide including an inclined surface upon which the carrier is adapted to move relatively to and toward the slide.

95. A machine for cutting helical gears comprising a frame, a gear blank support and a reciprocating slide mounted on the frame, a cutter carrier, and means for mounting the cutter carrier on said slide including an inclined surface upon which the carrier is adapted to move relatively to and toward the slide, and means to limit the movement of the carrier on said surface to limit its movement relatively to the slide.

96. A gear cutting machine comprising a frame, a support for a gear blank and a reciprocating slide mounted on the frame, said slide having a guideway thereon, a cutter carrier supporting a cutter, said carrier being connected to the slide to move on said guideway in an inclined direction relatively to the slide whereby when the slide moves relatively to the carrier the cutter will be caused to move in a direction toward and away from the slide.

97. A machine of the type described comprising a frame, a blank support, a reciprocable slide on said frame, a cutter support, means for mounting the cutter support on said slide including an inclined surface, and means to move the cutter support relatively to said slide upon said inclined surface including a continuously rotatable cam.

98. A machine of the type described comprising a frame, a blank support, a reciprocable slide on said frame, a cutter support, means for mounting the cutter support on said slide including an inclined surface, and means to move the cutter support relatively to said slide upon said inclined surface including a continuously rotatable cam, and means to limit the movement of said support upon said inclined surface.

99. In a gear cutting machine, a cutter shaft having rotating means associated therewith, a support for said shaft, said shaft and said shaft support being adapted for axial movement relatively to said shaft, and said shaft rotating means being slidable transversely to the axis of said shaft, and means including a continuously rotatable cam for causing axial movement of said shaft support and the transverse movement of said shaft rotating means.

100. In a gear cutting machine, a cutter shaft having rotating means associated therewith, a support for said shaft, said shaft and said shaft support being adapted for axial movement relatively to said shaft, and said shaft rotating means being slidable transversely to the axis of said shaft, means to convert the axial movement of said shaft and said shaft support into transverse movement relatively to the axis of said shaft, and means including a continuously rotatable cam for causing the axial movement of said shaft support, and the transverse movement of said shaft rotating means.

101. A machine of the type described comprising a frame, a blank support, a reciprocable slide on said frame, a cutter support, means for mounting the cutter support on said slide including an inclined surface, and means to move the cutter support relatively to said slide upon said inclined surface including a cam rotatable through a complete revolution.

In witness whereof, I have hereunto set my hand this fifteenth day of May, 1923.

WILLIAM EDWIN SYKES.